United States Patent [19]

Matthews et al.

[11] 4,429,528
[45] Feb. 7, 1984

[54] EMERGENCY FUEL SYSTEM

[75] Inventors: Robert B. Matthews, Chandler's Ford; Guy E. Davies, Fareham, both of England

[73] Assignee: Plessey Overseas Limited, Ilford, England

[21] Appl. No.: 227,268

[22] Filed: Jan. 22, 1981

[30] Foreign Application Priority Data

Jan. 22, 1980 [GB] United Kingdom ............... 8002144

[51] Int. Cl.³ .............................................. F02C 9/28
[52] U.S. Cl. ............................................. 60/39.281
[58] Field of Search .............................. 60/39.28 R

[56] References Cited

U.S. PATENT DOCUMENTS 2,700,872  2/1955  Lee .................................. 60/39.28 R
2,950,596  8/1960  Haase et al. ..................... 60/39.28 R
2,966,140  12/1960  Dungan et al. ................ 60/39.28 R Primary Examiner—Louis J. Casaregola
Attorney, Agent, or Firm—Fleit, Jacobson, Cohn & Price

[57] ABSTRACT

An emergency fuel control system for an aircraft engine, which emergency fuel control system comprises means for supplying emergency fuel to the engine such that the fuel supplied to the engine is proportional to engine speed and pressure, first fluidic means which is controlled by a pilot's throttle lever giving a throttle demand and which includes fluidic sensor inputs for limiting engine performance, second fluidic means which has an acceleration control for generating a signal pressure as a particular function of engine compressor ratio, a fluidic mixer for mixing an acceleration control signal and a pilot's control signal such that the pilot cannot demand more fuel than it is safe for the engine to accept, and a fluidic output device which receives signals from the fluidic mixer and which generates a signal which has substantially the same shape as the acceleration control signal but which is at a lower level and which is used to define the minimum amount of fuel that is safely required by the engine in order to maintain combustion of the engine.

9 Claims, 30 Drawing Figures

FIG. I. BLOCK DIAGRAM OF SYSTEM

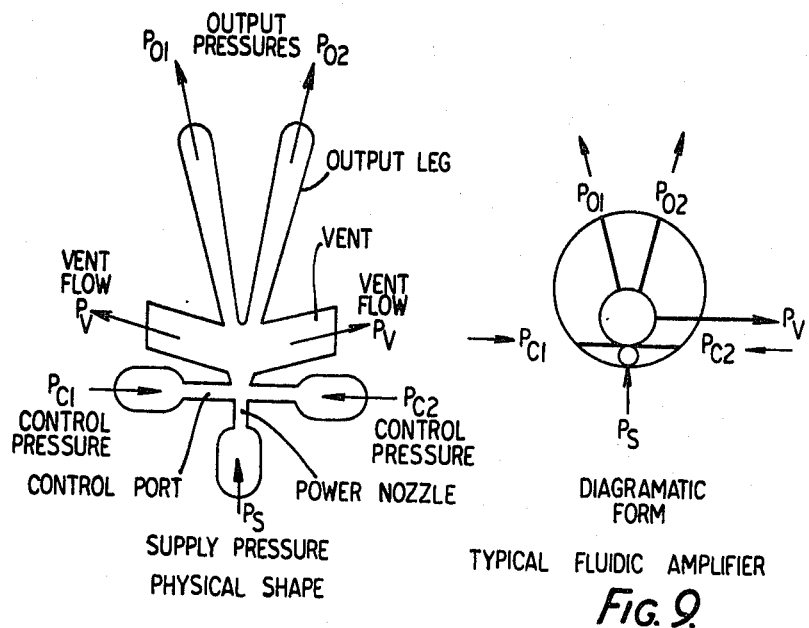
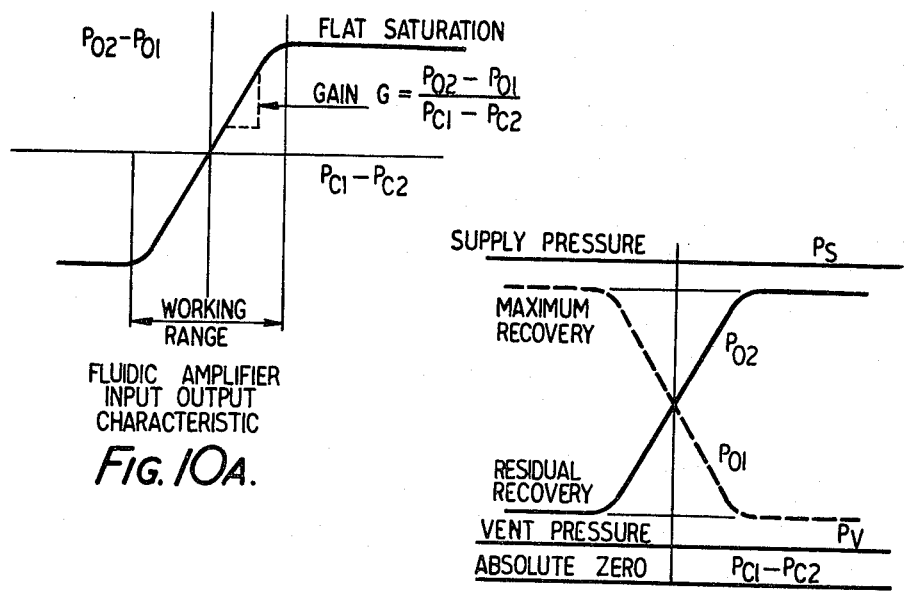

EFFECTS OF $P_S/P_V$ VARIATION

STABILISATION OF $P_S/P_V$

NORMAL OPERATION:
ON/OFF VALVE 14 AND FILTER 16

STANDBY OPERATION:
ON/OFF VALVE 14 AND FILTER 16

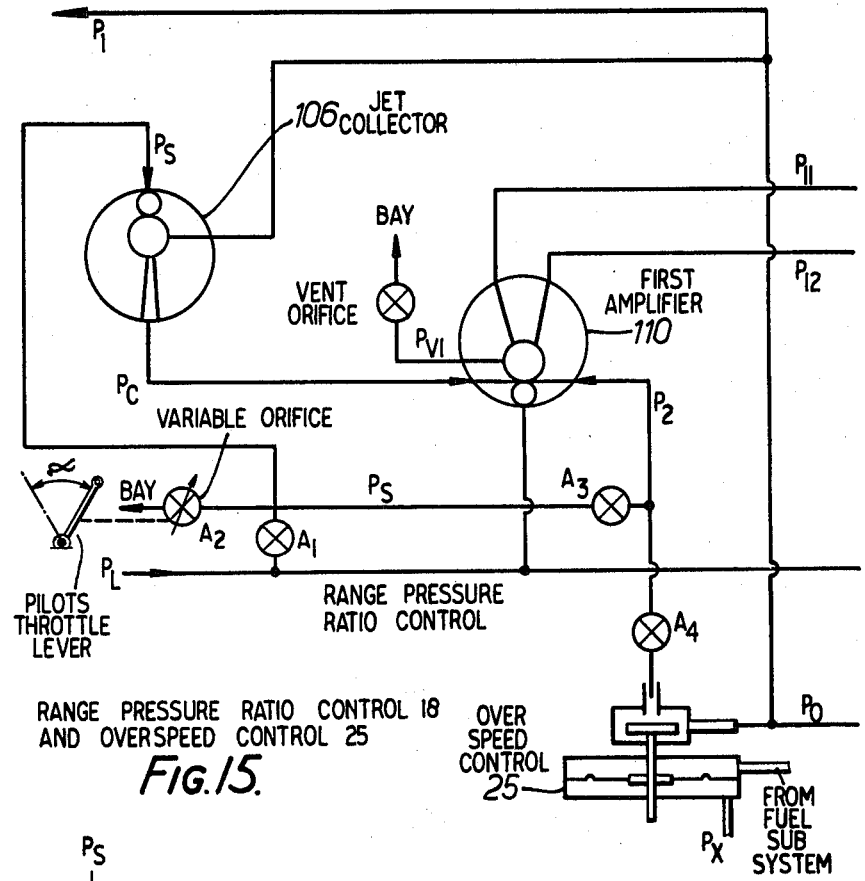
RANGE PRESSURE RATIO CONTROL 18
AND OVERSPEED CONTROL 25
FIG.15.
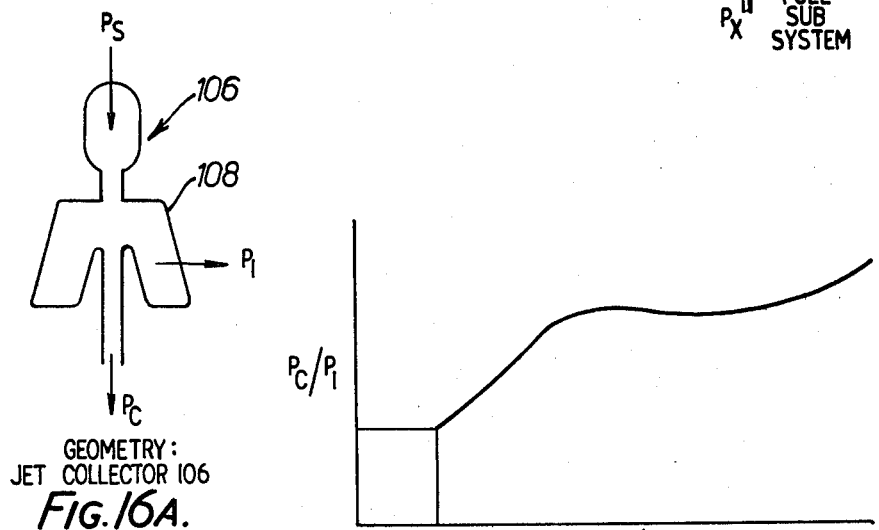
GEOMETRY:
JET COLLECTOR 106
FIG.16A.
PERFORMANCE: JET COLLECTOR 106
FIG.16B.

FIRST AMPLIFIER 110:
INPUT CHARACTERISTICS

FIRST AMPLIFIER 110:
OUTPUT CHARACTERISTICS

INPUT CHARACTERISTICS OF
OVERSPEED CONTROL
EFFECT ON AMPLIFIER No. 1.

OUTPUT CHARACTERISTICS OF
OVERSPEED CONTROL
EFFECT ON AMPLIFIER No. 1.

JET PIPE TEMPERATURE CONTROL AND AND $T_2$ COMPENSATOR

AMPLIFIERS 122 AND 140

ACCELERATION CONTROL

VENTURI PERFORMANCE

JET PUMP 152

PHYSICAL SHAPE:
EIGHTH AMPLIFIER 148

PERFORMANCE:
EIGHTH AMPLIFIER 148

ADJUSTMENT OF
ACCELERATION
CONTROL

LAYOUT: MIXER STAGE 24

PERFORMANCE: MIXER STAGE 24

LAYOUT:
OUTPUT STAGE 28

(B) PERFORMANCE

PERFORMANCE:
OUTPUT STAGE 28

FUEL FLOW CONTROL CHARACTERISTICS

EMERGENCY FUEL SYSTEM

This invention relates to an emergency fuel control system for an aircraft engine.

Developments in modern aircraft engine fuel system controls are leading towards the use of full authority digital electronic control systems in the immediate future. Such an approach offers very flexible controls making full use of flight parameters in addition to engine parameters, and enables optimum management to be achieved for any given purpose. Electronic systems can however be damaged by high intensity electro-magnetic radiation and it could well be that the digital electronic control system in the aircraft would cease to function with the result that the aircraft would crash.

It is an aim of the present invention to provide an emergency fuel control system for an aircraft, which emergency fuel system is mainly non-electronic and which can be brought into action instantly following the failure of the normal electronic control system in the aircraft.

Accordingly, this invention provides an emergency fuel control system for an aircraft engine, which emergency fuel control system comprises means for supplying emergency fuel to the engine such that the fuel supplied to the engine is proportional to engine speed and pressure, first fluidic means which is controlled by a pilot's throttle lever giving a throttle demand and which includes fluidic sensor inputs for limiting engine performance, second fluidic means which has an acceleration control for generating a signal pressure as a particular function of engine compressor ratio, a fluidic mixer for mixing an acceleration control signal and a pilot's control signal such that the pilot cannot demand more fuel than it is safe for the engine to accept, and a fluidic output device which receives signals from the fluidic mixer and which generates a signal which has substantially the same shape as the acceleration control signal but which is at a lower level and which is used to define the minimum amount of fuel that is safely required by the engine in order to maintain combustion of the engine.

Preferably, the fluidic sensor inputs which limit the engine performance comprise a jet pipe temperature sensing device (part of which is not fluidic) and a fluidic overspeed controller device.

The emergency fuel system may include a fluidic compensator for compensating for errors produced by changes of temperature, the fluidic compensator including a non-fluidic heat sink.

Preferably, the means for supplying the emergency fuel includes a spill control valve and a fuel change-over valve.

The means for supplying emergency fuel may include a fuel density compensating device for compensating for varying changes in the density of the fuel. The means for supplying the emergency fuel may also include a positive displacement pump or a centrifugal pump.

Preferably, the means for supplying the emergency fuel comprises a lever which is acted upon by an evacuated bellows arrangement and by a spring, the lever having valve means for controlling the amount of fuel led away from the engine.

Preferably, the valve means comprises a half ball valve on the lever, the lever pivoting at its end remote from the bellows device.

The emergency fuel system is preferably designed to take into account the following performance and design requirements.

Performance Requirements

The system should provide full control of the engine from flight idle to maximum power by normal action of the pilot's throttle lever.

Variation of thrust with throttle lever angle should be approximately linear, to provide an indication to the pilot of engine power setting. This is because cockpit instrument displays may also have failed.

The system should protect the engine from surge during "slam" accelerations. In the event of surge occuring, the system should respond by reducing fuel flow transiently to alleviate the situation.

The system should protect the engine from flame-out during "slam" decelerations.

The minimum power setting (flight idle) should be automatically increased as altitude is increased, to prevent flame out at high altitude.

The system should prevent the engine from exceeding its thermodynamic or "non-dimensional" performace limits. A limit on the maximum pressure ratio or on normalised speed parameter is acceptable here.

The system should prevent the engine from exceeding its structural performace limits. These are:
 (a) Maximum shaft speed.
 (b) Maximum compressor delivery presure.
 (c) Maximum turbine entry temperature.

It is reasonable for a standby system to measure one shaft speed only in a multishaft engine, since the other shafts will normally have a well established relationship with the measured shaft. It is also reasonable to deduce the compressor delivery pressure and the turbine entry temperature limits from other parameters if necessary.

The system should compensate approximately for variation of fuel density with temperature.

The system should be capable of accepting fuels of different types. A simple minor adjustment on the ground may be acceptable to cover fuels of different types.

No provision for starting on the ground is required.

Design Requirements

The system should function fully and completely with no electrical signal or power input whatever.

The system should remain dormant without deterioration, until required.

The system should be selected automatically on failure of the main control system. Provision for manual selection should also be made.

It should be possible to check the function of the system on the ground.

The normal mechanical fuel pumping arrangement for the main system may be assumed to remain functional.

Embodiments of the invention will now be described solely by way of example and with reference to the accompanying drawings in which:

FIGS. 3 to 30 illustrate in detail various parts of the emergency fuel control system shown in FIG. 1.

Figure 1:
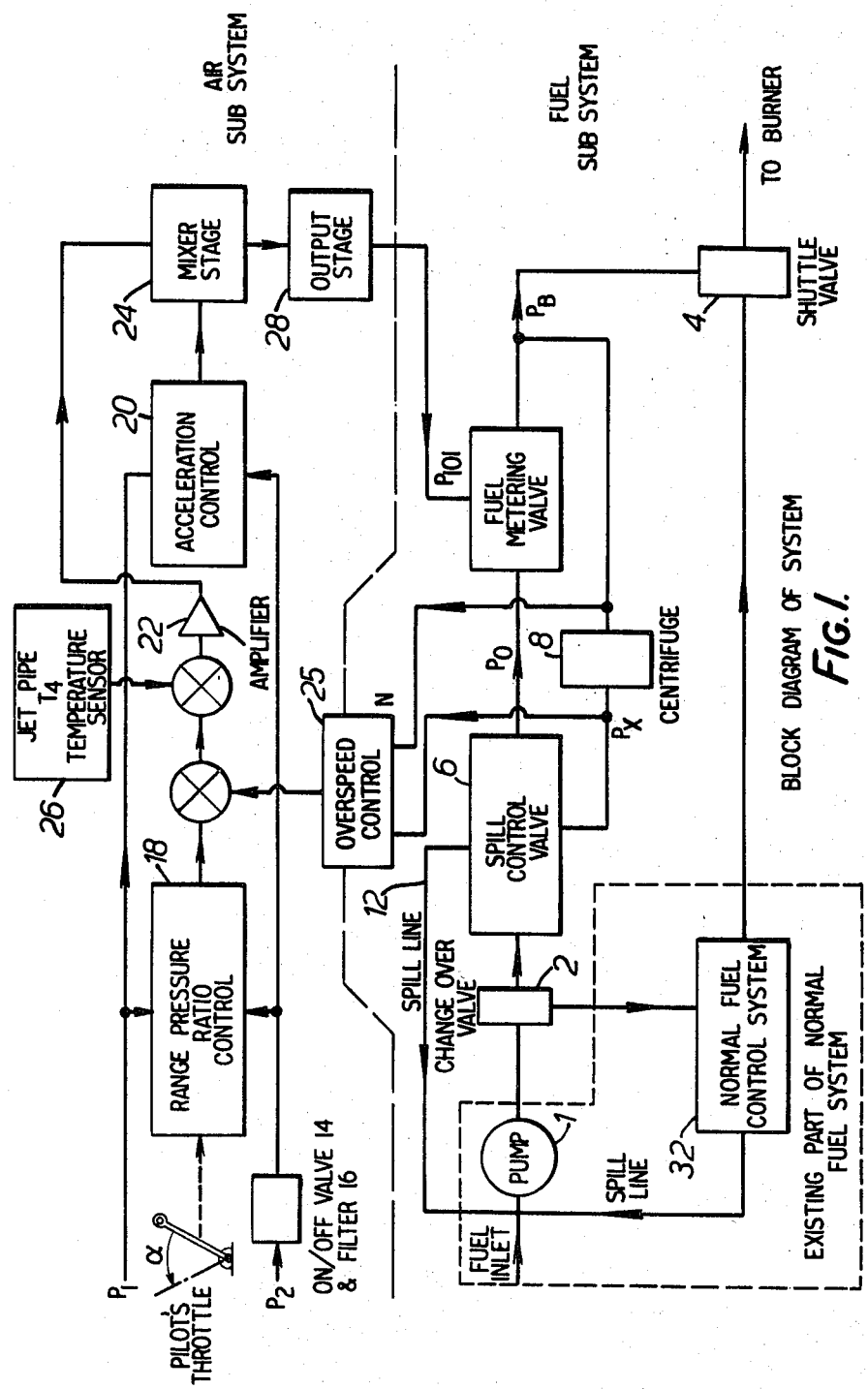
FIG. 1 is a block diagram of an emergency fuel control system for an aircraft engine.

Referring now to FIG. 1, a general description of the emergency fuel control system will first be given. In FIG. 1, it can be seen that the system can be divided into two sub-systems, one containing the fuel components, and one containing the air components. The functioning of the system will now be described by considering these two sub-systems separately.

Fuel Sub-Systems

It is assumed that the main engine fuel pump remains functional, and this is drawn on FIG. 1 as pump 1. The illustrated pump 1 is a positive displacement pump driven directly from the engine. (In the case of a multispool engine, the drive is normally taken from the high pressure spool). If a variable displacement pump, or centrifugal pump were to be used, a small re-arrangement of the illustrated system would be required, but this will not change the overall functioning of the system.

A change-over valve 2 and shuttle 4 are incorporated to isolate the standby system during normal operation, and to isolate the normal system during standby operation. As the system uses a positive displacement pump 1, spill lines must be provided to carry excess fuel back to pump inlet.

In standby operation, a spill control valve 6, using a signal pressure generated by a centrifuge 8 maintains a specific pressure drop across a fuel metering valve 10, and discharges excess flow via a spill line 12 to the pump inlet of the pump 1. The fuel metering valve 10 is controlled by the output stage of the air sub-system, and is designed to vary the fuel valve area directly in proportion to the absolute pressure level of air signal from the output stage. The fuel flow to the aircraft engine burners is thus controlled by the fuel metering valve area and the pressure drop across it.

If $P_D$ = fuel delivery pressure at the fuel metering valve 10.
$P_B$ = fuel pressure to the burners.
$A_F$ = fuel metering valve area.
$F$ = fuel mass flow.
$\rho_F$ = fuel density.

$$\text{Then } F = \rho_F A_F \sqrt{\frac{2(P_D - P_B)}{\rho_F}} \quad (1)$$

$$\text{i.e. } F = A_F \sqrt{2\rho_F(P_D - P_B)}$$

The pressure $P_D$ is controlled by the spill control valve 6 to be equal to the signal pressure $P_X$ generated by the centrifuge 8. The centrifuge 8 has a spinning disc driven at engine speed N, and is immersed in a chamber of fuel. It is essentially a simple form of centrifugal pump, and the pressure rise is given by:

$$P_X - P_B = K_C \rho_F N^2 \quad (2)$$

where $K_C$ is a constant depending on the centrifuge geometry.

But, $P_D = P_X$, and hence $P_D - P_B = K_C \rho_F N^2$.
Inserting this in equation (1)

$$F = A_F \rho_F N \sqrt{2k_C} \quad (3)$$

As stated above, the fuel metering valve area $A_F$ is directly proportional to the air sub-system output stage pressure $P_{101}$ so that $$A_F = K_F P_{101} \quad (4)$$

where $K_F$ is a constant determined by the valve design.

Also, the air sub-system is designed to generate a signal pressure ratio $P_{101}/P_1$ as a function of compressor pressure ratio $P_2/P_1$, engine speed N, jet pipe temperature $T_4$ and pilot's throttle angle $\alpha$. This function may be treated at this stage as a generalised control function $f(C)$.

$$\text{Thus } \frac{P_{101}}{P_1} = f(C) \quad (5)$$

and hence $P_{101} = P_1 \times f(C)$

Combining equations (4) and (5) with equation (3) gives $$F = K_F P_1 f(C) \rho_F N \sqrt{2K_C} \quad (6)$$

and hence $\frac{F}{P_1 N} = f(C) \times \rho_F K_F \sqrt{2K_C}$

The fuel flow control parameter should be $F/P_1 N$ as a function of $P_2/P_1$ and the other control parameters.

The layout of the fuel sub-system shown on FIG. 1 enables this to be achieved provided that the term $\rho_F K_F \sqrt{2k_C}$ remains constant.

However, over the full operating fuel temperature range of $-50°$ C. to $+150°$ C. (158° F. to 302° F.) the density may vary by $\pm 9\%$ of the means value at 50° C. (122° F.), and so some compensation is required. This may be obtained by introducing a temperature sensitive bleed across the centrifuge to reduce its output pressure by an appropriate amount. The expression of equation (2) then is modified as follows $$P_X - P_B = K_C \rho_F N^2 \times f_1(T_F) \quad (7)$$

where $T_F$ is the fuel temperature and $f_1$ ($T_F$) is a function determined by the design of the temperature sensitive bleed, and by the performance characteristic of the centrifuge. This bleed is not shown separately on FIG. 1.

Equation (3) then becomes $$F = A_F \rho_F N \sqrt{2K_C f_1(T_F)} \quad (8)$$

and equation (6) becomes $$\frac{F}{P_1 N} = f(C) \times \rho_F K_F \sqrt{2K_C f_1(T_F)} \quad (9)$$

If $f_1(T_F)$ is made equal to $(1/\rho_F^2)$ then the density term can be fully compensated. However, it may be seen from FIG. 1 that the centrifuge pressure rise $P_X - P_B$ is also used to operate an overspeed control as an input to the air sub-system. From equation (7)

$$P_X - P_B = K_C \rho_F N^2 f_1(T_F)$$

so if the density term is to be compensated in this expression then $f_1(T_F)$ must be made equal to $(1/\rho_F)$, but a reasonable compromise can be obtained if $f_1(T_F)$ is made equal to $$\frac{1}{\rho_F^{1.5}} \text{ hence } f_1(T) = \frac{1}{\rho_F^{1.5}} \tag{10}$$

and inserting this in equation (9) gives $$\frac{F}{P_1 N} = f(C) \times \rho_F K_F \sqrt{\frac{2K_C}{\rho_F^{1.5}}} \tag{11}$$

i.e. $\frac{F}{P_1 N} = f(C) \times \sqrt[4]{\rho_F} \; K_F \sqrt{2K_C}$

The error in $(F/P_1N)$, due to density variations of $\pm 9\%$ is therefore reduced to $\pm 2.3\%$ The pressure difference at the overspeed control becomes $$P_X - P_B = K_C \rho_F N^2 \frac{1}{\rho_F^{1.5}}$$

and hence $N^2 = (P_X - P_B) \sqrt{\frac{\rho_F}{K_C}}$ which gives $N = \sqrt[4]{\rho_F} \; \sqrt{\frac{P_X - P_B}{K_C}}$ The error in overspeed control is therefore also proportional to $4\sqrt{\rho_F}$ which, as shown above, results in errors of $\pm 2.3\%$ over the full fuel temperature range. It is considered that these errors are acceptable, but if greater overspeed control accuracy is required, the compensation can be adjusted to increase the error in $(F/P_1N)$, and consequently reduce the error in N.

Since most fuels have approximately the same variation of density with temperature, it is possible to accommodate a variety of fuel types by the use of an adjustable datum on the compensation bleed.

From equations (8) and (10) it can be seen that $$F = A_F N \times \sqrt[4]{\rho_F} \; \sqrt{2K_C}$$

This fits the requirement of fuel flow proportional to valve area and engine speed. Accordingly a maximum area stop provides protection against maximum compressor delivery pressure and a minimum area stop provides a suitable flight idle-stop.

Air Sub-System

The air sub-system consists of a fluidic computer and amplifiers with sensors for pilot's throttle angle, maximum engine speed, and maximum jet pipe temperature. Compressor delivery pressure $P_2$ is admitted to the system via an on/off valve and air filter 16. A connection is also made to compressor inlet pressure $P_1$, and the main control parameter is compressor pressure ratio $P_2/P_1$.

The fluidic computer contains two major functional blocks. These are the range pressure ratio control 18, and the acceleration control 20. The range pressure ratio control 18 computes the actual compressor pressure ratio $P_2/P_1$ and compares it with the demanded pressure ratio as indicated by the pilot's throttle input. The error signal, appearing as a fluidic control pressure, is passed to an amplifier 22, and then to the mixer state 24. The signal may be modified by the presence of an overspeed signal from an overspeed control 25 or by a signal indicating excessive jet pipe temperature $T_4$ from a jet pipe temperature sensor 26. If engine speed and jet pipe temperature are within limits, however, the signal reaches the mixer stage 24 without modification.

The acceleration control 20 computes the compressor pressure ratio $P_2/P_1$ independently, and generates an output pressure signal which is a shaped function of $P_2/P_1$. This signal is fed to the mixer stage 24 to provide a maximum limit to the authority of the amplified signal from the range pressure ratio control 18. Thus, if a rapid acceleration is demanded by the pilot, a large signal is generated by the range pressure ratio control, but the amplitude of this is limited in the mixer stage 24 by the signal from the acceleration control 20. When a deceleration is demanded however, no corresponding lower limit is applied.

The mixer stage 24 drives an output stage 28 which amplifies the signal to the appropriate level to interface with the fuel metering valve 10. A secondary signal is generated in the output stage 28 to impose a minimum limit on the output when a deceleration is demanded.

The output pressure $P_{101}$ from the output stage 28 is therefore a function of $P_2/P_1$, N, $T_4$ and pilot's throttle angle $\alpha$. In addition, pressure $P_{101}$ is also fundamentally related to compressor inlet pressure $P_1$ by the design of the fluidic computer power supply, such that $P_{101}/P_1$ is a unique function of $P_2/P_1$, N, $T_4$ and $\alpha$. i.e. $(P_{101}/P_1) = f(P_2/P_1, N, T_4, \alpha)$.

This function is the general control function referred to above, $$\text{i.e. } \frac{P_{101}}{P_1} = f(C) \text{ (see equation (5))} \tag{12}$$

Complete System

From the foregoing it can be seen that the fuel flow to the burners is governed by the relationships of equations (11) and (12)

$$\frac{F}{P_1 N} = f(C) \times \sqrt[4]{\rho_F} \; K_F \sqrt{2K_C} \tag{13}$$

and $\frac{P_{101}}{P_1} = f(C)$ so that $\frac{F}{P_1 N} = \frac{P_{101}}{P_1} \sqrt[4]{\rho_F} \; K_F \sqrt{2K_C}$ Steady state control of engine power is maintained by the range pressure ratio control 18 which adjusts $(P_{101}/P_1)$ and hence $(F/P_1N)$ to hold the compressor pressure ratio $P_2/P_1$ at constant value set by the pilot's throttle input. Surge avoidance during rapid accelerations is achieved by the acceleration control 20 which limits $(P_{101}/P_1)$, and hence $(F/P_1N)$, according to a shaped function of $P_2/P_1$. Flame extinction during rapid deceleration is avoided by the secondary signal in the output stage which imposes a minimum limit on $(P_{101}/P_1)$ and hence on $(F/P_1N)$.

Overspeed control for the overspeed control 25 is provided by a signal derived from the centrifuge 8 and which generates an input into the air sub-system. This input modifies the range pressure ratio control signal in the event of the shaft speed exceeding the maximum. Excessive jet pipe temperature also generates an input to the air sub-system which similarly modifies the range pressure ratio control signal.

Maximum and minimum area stops in the fuel metering valve 10 provide maximum compressor pressure limitation, and flight idle stop setting respectively.

The variation of fuel density with fuel temperature is approximately compensated for by the inclusion of a temperature sensitive bleed in the centrifuge outlet. Conflicting requirements exist for the compensation for normalised fuel flow ($F/P_1N$), and for overspeed control. A compromise is proposed which results in a potential error in both ($F/P_1N$) and maximum speed of ±2.3% over a fuel temperature range of −50° C. to 150° C. (−58° F. to 302° F.).

Fuels of different types can be accommodated by the use of an adjustable datum on the temperature sensitive bleed.

System Schematic and Components

Figure 2:
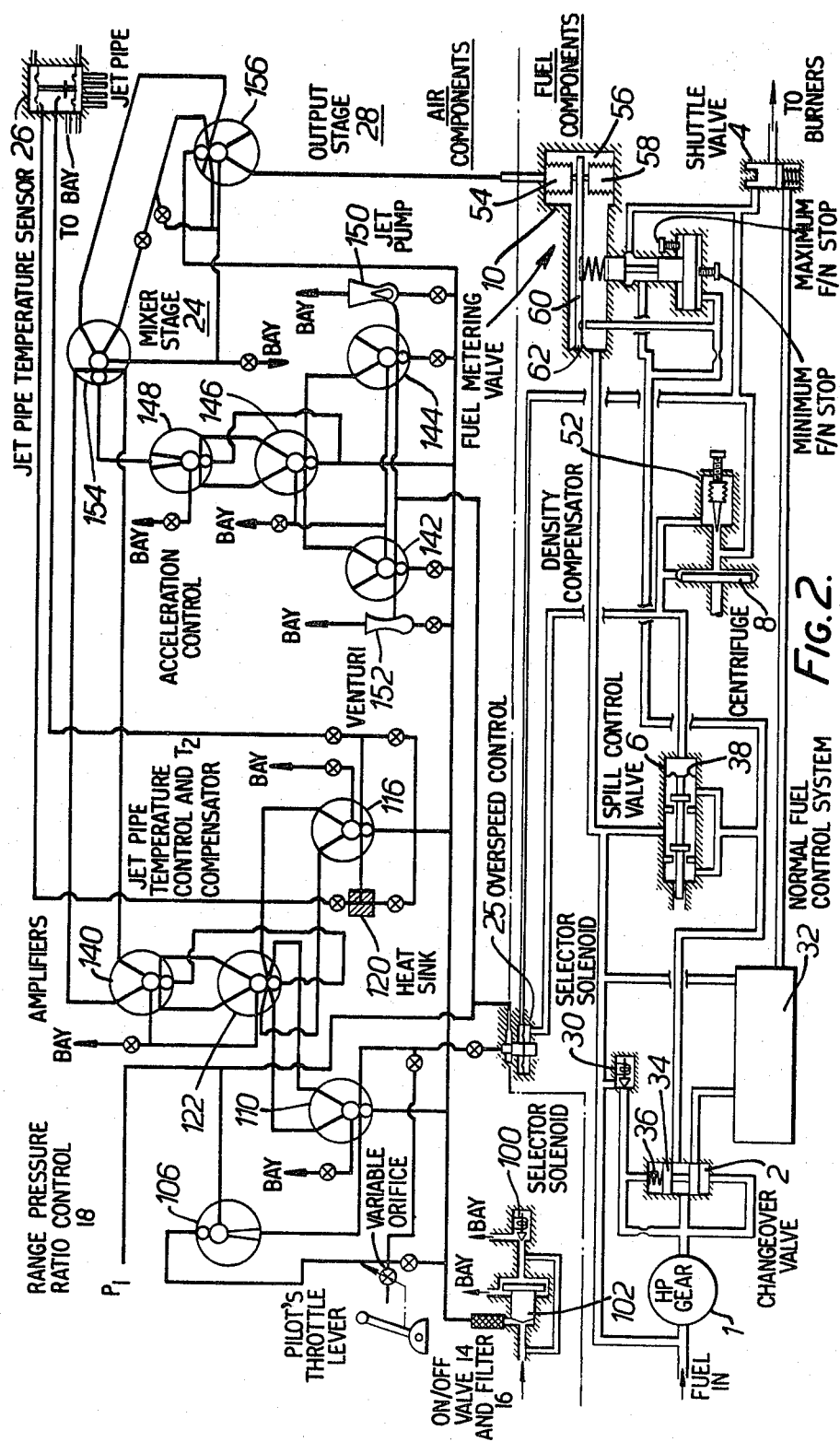
FIG. 2 is a more detailed drawing of the emergency fuel control system shown in FIG. 1.

Referring now to FIG. 2, there is shown in more detail than FIG. 1 a schematic diagram of the complete control system. FIG. 2 illustrates the functional details of the system but it is not intended to show details of engineering, nor the physical layout of the component parts. The fuel components are all simple mechanical devices using well established design principles, to ensure high reliability and minimum cost. The air components consist of the fluidic elements which constitute the fluidic computer, plus the associated input devices, together with the on/off valve and air filter.

A detailed description of the operation of firstly the fuel components and secondly the air components is given below.

FUEL COMPONENTS

Pump 1

The main fuel pump 1 is assumed to remain operative and the system shown has been drawn for the case of a positive displacement pump, as indicated above. A high pressure gear pump 1 is actually shown in FIG. 2.

Change-Over Valve 2

Figure 3A:
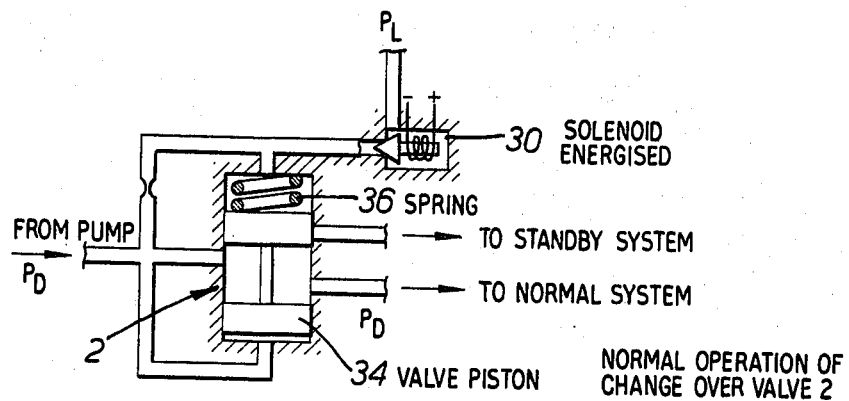

A servo-operated change-over valve 2 is incorporated to give isolation of the inoperative system. A selector solenoid 30 is controlled directly from a main fuel system electronic computer 32. In normal operation, the solenoid 30 is energised closed and so maintains pump delivery pressure on the upper surface of a valve piston 34, as shown in FIG. 3A. This balances the same pressure on the lower surface so the valve takes up the position shown, under the action of a spring 36, to seal off the standby system, and admit pump delivery flow to the normal system.

Figure 3B:
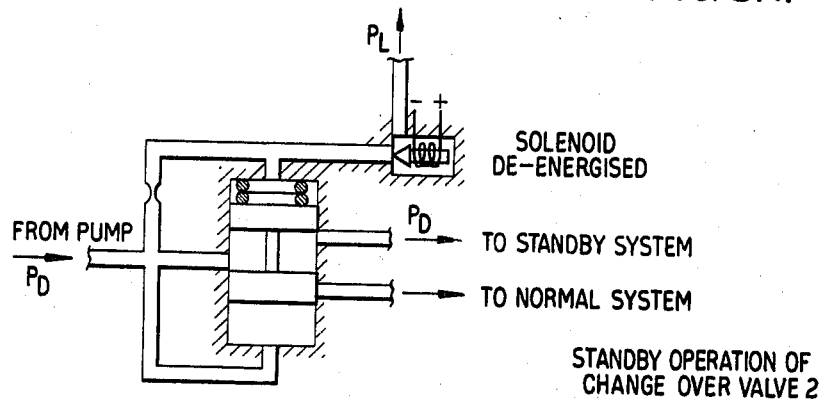

In the event of a failure of the electronics controlling the normal system, or of a total electrical failure, the solenoid 30 is de-energised and is forced open by the fuel pressure. The pressure on the upper surface of the valve piston 34 is released and the valve moves to the position shown in FIG. 3B, sealing off the normal system and admitting pump delivery flow to the standby system.

Spill Control Valve 6

Figure 4:
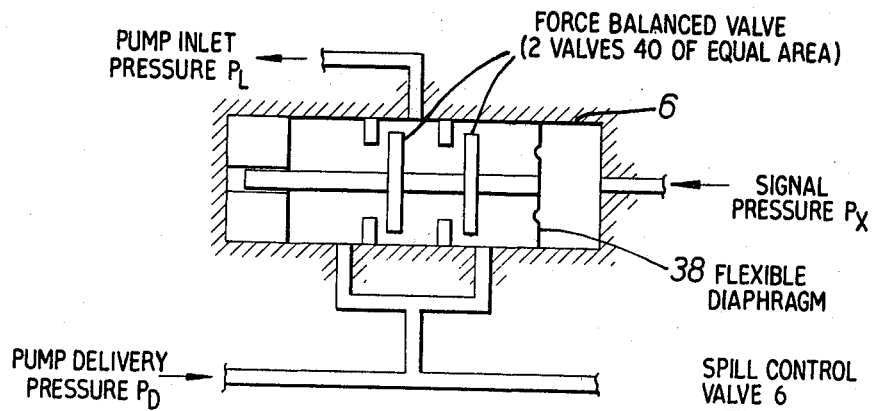

The spill control valve 6 is a simple, force-balanced fuel valve, operated by movement of a flexible diaphragm 38 as shown in FIG. 4. The valve forces arising from the difference between pump delivery pressure $P_D$ and pump inlet pressure $P_L$ are balanced by the two equal area valves 40. The valve assembly is then free to move under the action of the signal pressure $P_X$ opposing $P_D$ on the diaphragm 38. Thus if $P_X$ is greater than $P_D$ the valve moves towards the closed position, reducing the spill flow ad hence increasing $P_D$. When $P_D$ equals $P_X$ the diaphragm 38 is in balance and the valve assembly stops moving. The valve therefore, controls the spill flow to maintain pump delivery pressure $P_D$ equal to the signal pressure $P_X$.

Centrifuge 8 and Density Compensator 52

Figure 5:
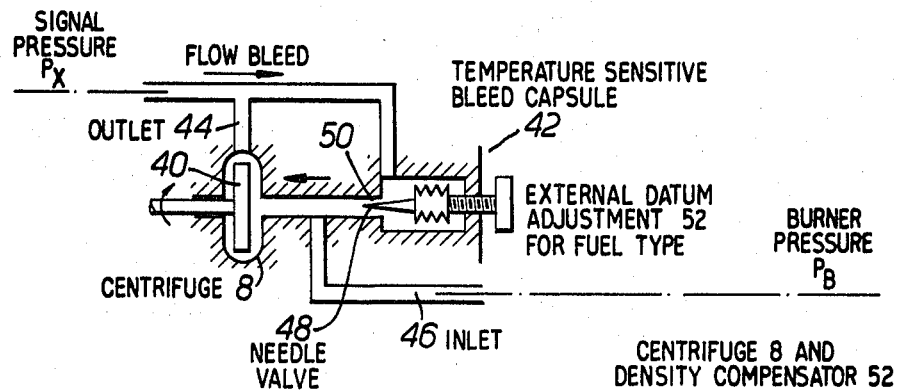

The simple centrifuge 8, comprising a spinning disc 40 driven at engine speed N, generates the signal pressure $P_X$ which controls the spill control valve 6. The centrifuge 8 is most conveniently mounted on the body of the gear pump 1 to obtain a common mechanical drive. Fuel density compensation is obtained by the use of a temperature sensitive bleed capsule 42 between the output 44 and the inlet 46 of the centrifuge 8. The temperature sensitive capsule, shown on FIG. 5, carries a needle 48 which partially restricts an orifice 50, allowing a small bleed flow to pass from the centrifuge outlet 44 back to the inlet 46. At high temperatures, the fuel density is reduced, and as shown by equation (7) the pressure rise $P_X - P_B$ would also be reduced. However, the capsule 42 expands due to the increased temperature and pushes the tapered needle 48 further into the orifice 50, thus reducing the bleed flow area. This reduction in bleed area increases the pressure rise to compensate for the density change. The compensation law is determined by the shape of the needle 48 and by the pressure/flow characteristic of the centrifuge 8. The law required is given by equation (10) as:

$$f_1(T_F) = \frac{1}{\rho_F^{1.5}}$$

An external datum adjustment 52 is provided to allow the unit to be reset for other fuels of different density. This is possible because all fuels have a similar variation of density with temperature, so a different fuel may be regarded as if it were the original fuel at a different temperature.

Fuel Metering Valve 10

Figure 6:
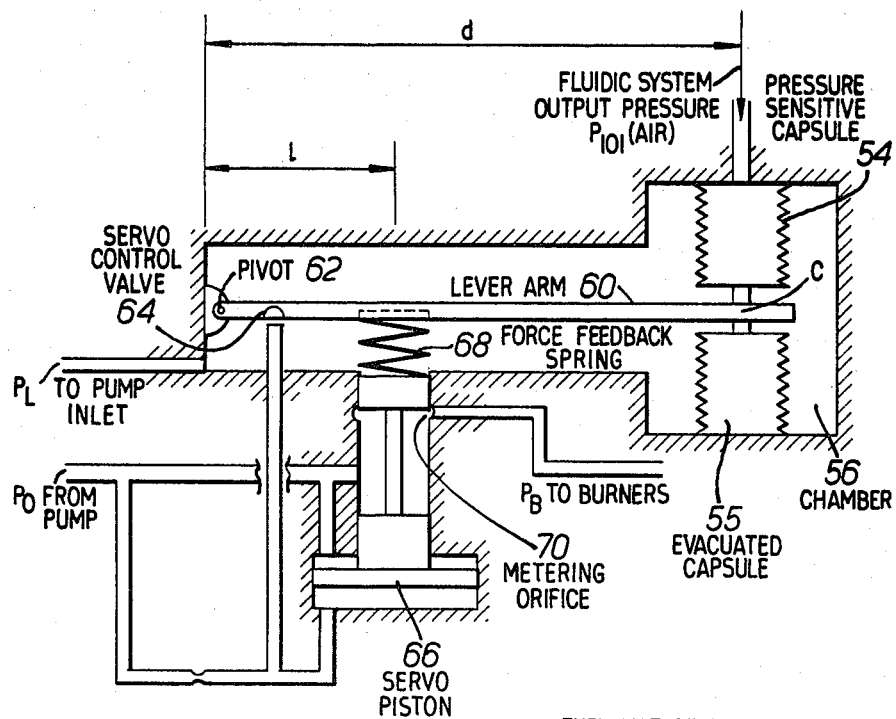

The fuel metering valve 10 is the main interface between the air and the fuel sub-systems, and is shown in FIG. 6. A pressure sensitive capsule 56 is connected to the output of the fluidic sub-system at pressure $P_{101}$ and is immersed in a chamber 56 at the fuel pump inlet pressure $P_L$. The extending force, Lp on the capsule 54 is thus given by the expression:

$$L_p = A_p(P_{101} - P_L)$$

Where Ap is the effective cross-sectional area of the capsule 54.

An evacuated capsule 58 has the same cross-sectional area as the capsule 54 and is also immersed in the chamber 56. It is therefore subject to a compressive force $L_V$ where:

$$L_V = A_p P_L$$

The two capsules 54, 58 are mechanically coupled together, and bear on a lever arm 60 at point C. The total load exerted on the lever arm at C is therefore:

$$L_C = L_P + L_V \quad (14)$$
$$= A_p(P_{101} - P_L) + A_p P_L$$

i.e. $L_C = A_p \times P_{101}$

The load $L_C$ rotates the lever arm 60 in a clockwise direction about a pivot 62, and thereby closes a servo control valve 64. The pressure on the large (lower) side of a servo piston 66 is increased and because of the differential area of the piston, it moves upwards. In doing so it compresses a force feedback spring 68 which imparts a load to the lever arm 60 so as to oppose the clockwise movement imparted by the capsule assembly 54, 58, thus restoring the lever arm 60 to a balanced condition.

If the gain of the servo control valve 64 is high, the balanced condition will be reached with only a very small movement of the lever arm 60. If, in addition, the spring stiffness of the two capsules 54, 58 is low, the capsule load $L_C$ will be effectively unchanged due to this small movement. The force imparted by the feedback spring 68 to restore the lever arm 60 to balance will thus be equal to $L_C$ times the lever arm ratio of the two forces.

i.e. $L_B = \dfrac{d}{l} \times L_C \quad (15)$

Where $L_B$ is the force transmitted by the feedback spring 68 from the servo piston to the lever arm 60.

If stiffness of the feedback spring 68 is S and the movement of the servo piston 66 is X then $$L_B = SX$$

Combining this with equations (14) and (15) gives $$X = \dfrac{d}{l} \dfrac{A_p}{S} \times P_{101} \quad (16)$$

A fuel metering orifice 70 consists of an annular recess in the smaller bore of the servo unit and is controlled directly by the linear movement X of the servo piston 66.

Thus $A_F = 2\pi r X$
Where r is the radius of the small bore
Inserting this into equation (16) gives:

$$A_F = 2\pi r \dfrac{d}{l} \dfrac{A_p}{s} \times P_{101}$$

Which can be re-written as:

$$A_F = K_F \times P_{101} \text{ (see equation (4))} \quad (17)$$

The fuel metering valve 10 thus varies the flow area $A_F$ directly in proportion to the absolute value of the air sub-system output pressure $P_{101}$.

Shuttle Valve 4

Figure 7A:
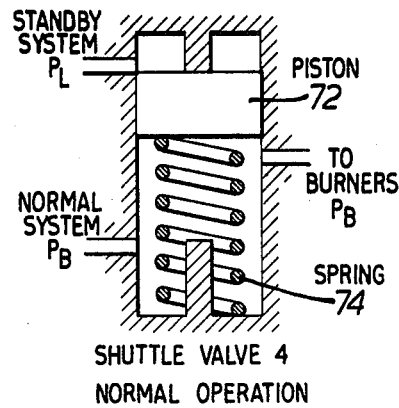
Figure 7B:
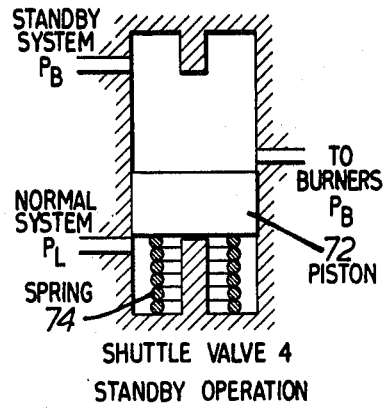

The shuttle valve 4 is illustrated in detail in FIGS. 7A and 7B. The shuttle valve 4 isolates the output of the active system from the inactive system. In normal operation as illustrated in FIG. 7A, the standby system is at pump inlet pressure so the normal system output $P_B$ forces a piston 72 to the upper end of its stroke, sealing off the standby system, and admitting normal system flow to the burners. In standby operation as illustrated in FIG. 7b, the normal system pressure drops to $P_L$, and the standby system output pressure rises to $P_B$. The piston 72 is forced to the bottom of its stroke, sealing off the main system and admitting standby system flow to the burners. A light spring 74 is incorporated to ensure that the shuttle valve 4 remains in the normal mode when the engine is shut down.

Overspeed Control 25

Figure 8:
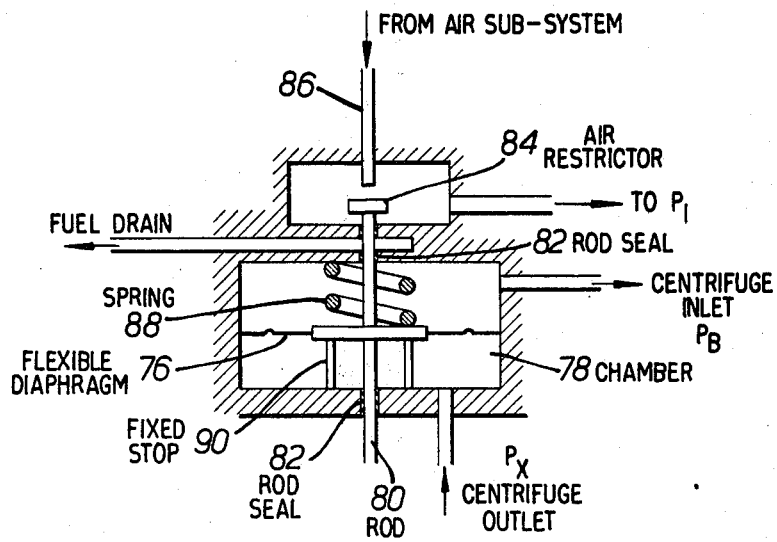

The overspeed control 25 is illustrated in detail in FIG. 8. It is a simple differential pressure sensor working on the pressure rise across the centrifuge $P_X - P_B$. The two pressures are admitted to opposite sides of a flexible diaphragm 76 contained in a chamber 78. A rod 80 connected to the diaphragm 76 passes through seals 82 in the ends of the chamber 78, and one end of the rod 80 forms an air restrictor 84 with the open end of a pipe 86 connected to the air sub-system. A spring 88 normally holds the diaphragm 76 against a fixed stop 90, and in this position the air restrictor 84 is fully open, offering no resistance to flow from the air sub-system.

When the engine speed N approaches its maximum, the pressure difference $P_X - P_B$ rises sufficiently to overcome the spring force, and lift the diaphragm 76 off the fixed stop 90. Further increase in engine speed causes the pressure difference $P_X - P_B$ to rise further and progressively close off the air restrictor 84, thus introducing an overspeed signal into the air sub-system.

AIR COMPONENTS

Fluidic Amplifiers

The air sub-system consists of a fluidic computer and its input devices. The individual fluidic amplifiers making up the computer have been shown in diagrammatic form in FIG. 2 as amplifiers 110, 116, 122, 140, 142, 144, 146 and 148. This representation is compared with the physical form of the amplifiers in FIG. 9.

The amplifier shown in FIG. 9 is a momentum interaction amplifier of the "beam deflection" type, and generates an output pressure difference $Po2 - Po1$ which is directly proportional to the control pressure difference $Pc1 - Pc2$, as shown in FIG. 10A. The ratio $$\dfrac{Po2 - Po1}{Pc1 - Pc2}$$

is the pressure gain G of the amplifier. Of particular importance is the flat "saturation" characteristic which holds an approximately constant output when the control signal drives the amplifier outside the normal working range. This characteristic allows out of range signals to be accepted without inducing system malfunctioning.

The differential output pressure $Po2 - Po1$ over the working range can be expressed as:

$$Po2 - Po1 = G(Pc1 - Pc2) \quad (18)$$

Outside the working range, that is in saturation, the output becomes:

$$(Po2 - Po1)_{Max} = K(Ps - Pv) \quad (19)$$

Where the term K is defined as the recovery factor.

FIG. 10B shows a graph of individual output leg pressures Po2 and Po1. Over the working range these can be expressed as:

$$Po2 = Pv + (K_R + K/2)(Ps - Pv) + G/2(Pc1 - Pc2) \quad (20)$$

$$Po1 = Pv + (K_R + K/2)(Ps - Pv) + G/2(Pc1 - Pc2) \quad (21)$$

where $K_R$ is defined as the residual factor.
Outside the working range, the output becomes:

$$Po2_{Max} = Po1_{Max} = Pv + (K_R + K)(Ps - pv) \quad (22)$$

$$Po2_{Min} = Po1_{Min} = Pv + K_R(Ps - pv) \quad (23)$$

Figure 11:
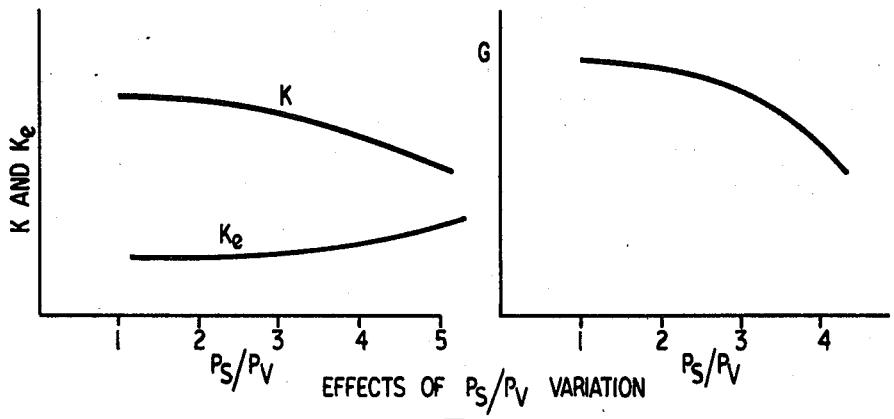

It has been found by experience that the performance of fluidic amplifiers is dependent on the supply to vent pressure ratio Ps/Pv. The variation of K, $K_R$ and G with Ps/Pv is shown in FIG. 11 and it is clear that for best performance Ps/Pv should not exceed a value of 4 to 5. However, the amplifiers are used on an engine system where the supply pressure may be equal to compressor delivery pressure P2 and the vents discharge ultimately to the engine bay or similar area where the pressure will be at or near intake pressure P1. The maximum compressor pressure ratio will depend on the application, but may well be in the range of 25 to 30. Consequently it is necessary to restrict the ratio Ps/Pv by some means.

Figure 12:
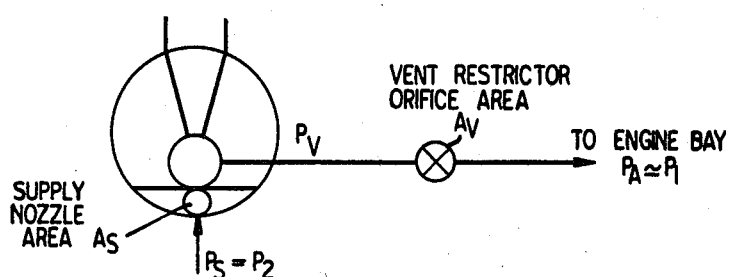

The simplest method of limiting Ps/Pv whilst at the same time retaining the maximum available supply pressure, is to collect the vent flow and pass it through a restrictor before discharging it overboard, as shown in FIG. 12. The vent pressure is elevated by the restrictor, and rises farther above bay pressure as P2/P1 is increased. The amplifier power nozzle will normally be choked and eventually the vent restrictor also chokes. When this occurs, the vent pressure is related to the supply pressure by the expression:

$$Pv = \frac{As}{Av} \times Ps$$

where Av is the vent restrictor orifice effective area and As is the supply nozzle effective area. This can be rewritten:

$$\frac{Ps}{Pv} = \frac{Av}{As}$$

Figure 13:
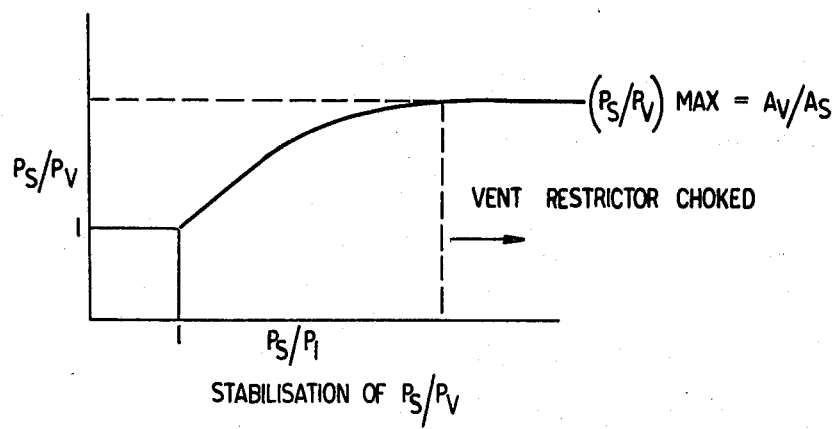

Which means that the supply to vent pressure ratio is then limited to a maximum value determined by the fixed geometry of the system. This is illustrated in FIG. 13.

On/Off Valve 14 and Filter 16

The servo-operated on/off valve 14 is incorporated in the air supply from the compressor, to allow the standby system to be dormant when not required. The high temperature filter 16 is incorporated in the valve outlet 98 to provide a clean air supply to the air sub-system, as shown in FIG. 14.

Figure 14A:
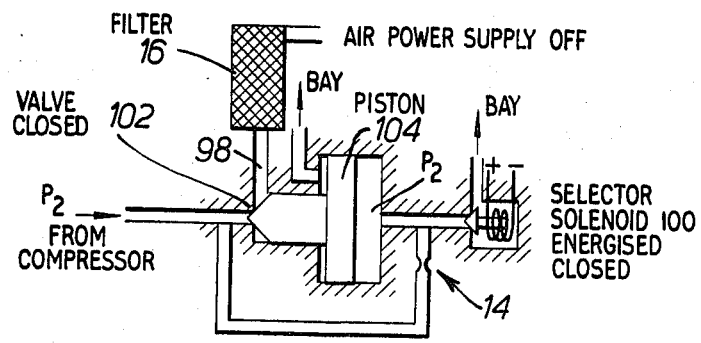

A selector solenoid 100 is controlled directly from the main fuel system electronic computer, and in normal operation is energised closed as shown in FIG. 14A. This causes compressor pressure P2 to be maintained on the large area of the piston so that a valve 102 is held closed.

Figure 14B:
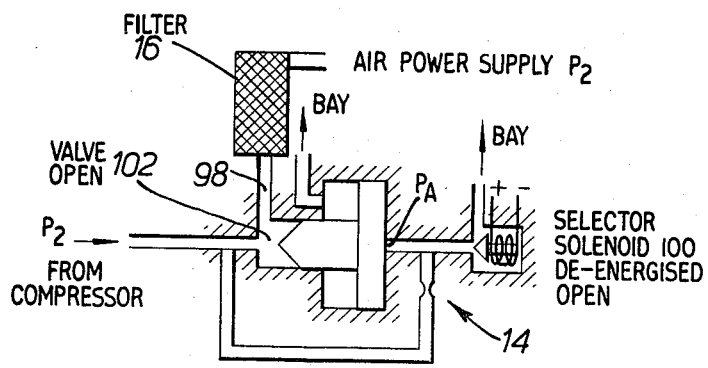

In the event of a failure of the electronics controlling the normal system, or of a total electrical failure, the solenoid is de-energised and is forced open by the compressor pressure as shown in FIG. 14B. The pressure on the large side of a piston 104 is released and falls to bay pressure $P_4$. The valve 102 is pushed open by compressor pressure, admitting flow to the filter 96. The filter 16 is a high temperature, low loss filter which provides a clean air supply at P2 pressure to the rest of the air sub-system.

Range Pressure Ratio Control 18 and Overspeed Control 25

The range pressure ratio control 18 and overspeed control 25 are shown in FIG. 15. An air potentiometer is formed by the fixed orifice A1 and the combination of the variable orifice A2 connected to the pilot's throttle lever, plus the fixed orifices A3 and A4.

The orifice A2 is designed to operate in a choked condition so that the intermediate pressure Ps is always directly proportional to P2, the constant of proportionality being dependent on the area ratio A1/(A2+A3) and hence on pilot's throttle lever angle α. Pressure Ps is used as the power supply to a jet collector 106 which is vented to intake pressure P1. The jet-collector 106 consists of a nozzle and receiver combination 108 as shown in FIG. 16A, and by careful design, the shock wave losses in the free jet produce a characteristic of Pc/P1 vs Ps/P1 as shown in FIG. 16B. The jet-collector 106 therefore acts as a pressure ratio function generator.

Figure 17A:
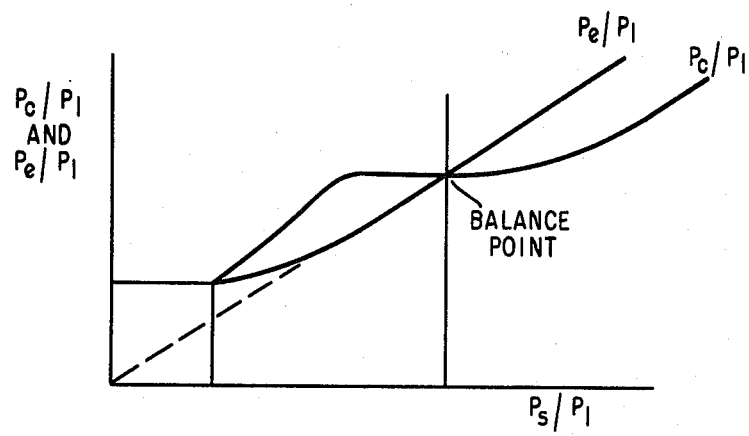
Figure 17B:
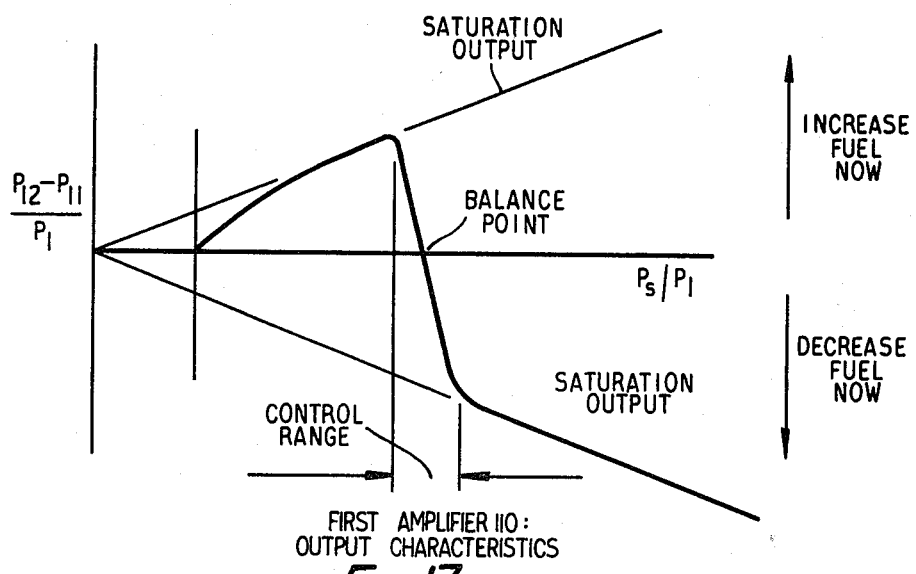

The pressure Ps also powers a second air potentiometer consisting of the fixed orifices A3 and A4. Orifice A4 is designed to operate in a choked condition so that the intermediate pressure $P_R$ is directly proportional to Ps. The pressures Pc and $P_R$ are used as the control signals for a first amplifier 110 which is powered from compressor pressure P2 and has a vent pressure stabilised at Pv1 by the vent restrictor described above with reference to FIGS. 12 and 13. The inputs, outputs and vent of the amplifier 110 are shown on FIG. 17.

The outputs from the amplifier 110 ultimately control the mixer stage 24 which in turn controls the output stage 28 to demand the appropriate fuel flow from the fuel metering valve 10, see FIG. 2. A positive output as shown on FIG. 17B demands an increase in fuel flow to accelerate the engine, whilst a negative output demands a decrease in fuel flow to decelerate the engine. At some point in the control range between these two conditions, the output demands a fuel flow coresponding to the steady running condition on the engine. This will be close to, but not necessarily at, the balance point shown on FIGS. 17A and 17B.

When the pilot opens the throttle to demand an acceleration, the variable restrictor A2 is opened to drop Ps and hence reduce the ratio Ps/P1. From FIG. 17 it can be seen that as Ps/P1 reduces, the amplifier output increases to demand an increased fuel flow. The engine accelerates in response to this, and in consequence the compressor pressure ratio P2/P1 increases to restore Ps/P1. The amplifier output again enters the control range and the engine stabilises at a new steady running condition.

Figure 18A:
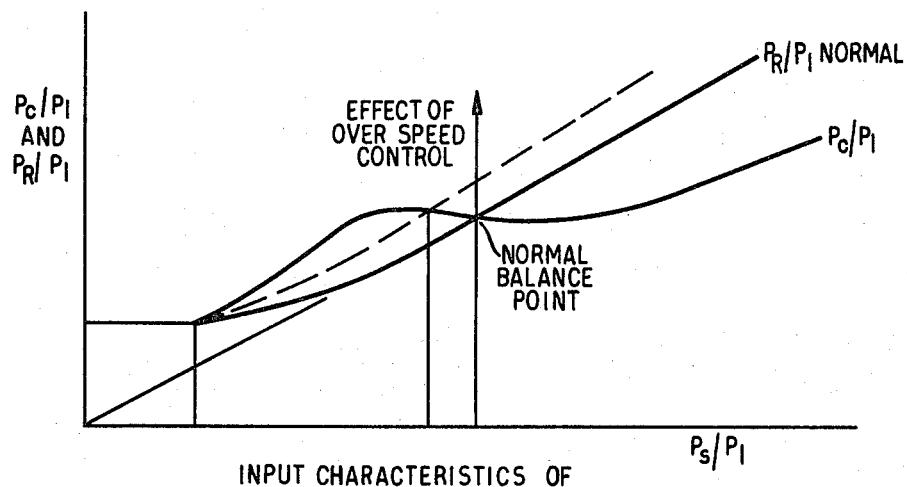
Figure 18B:
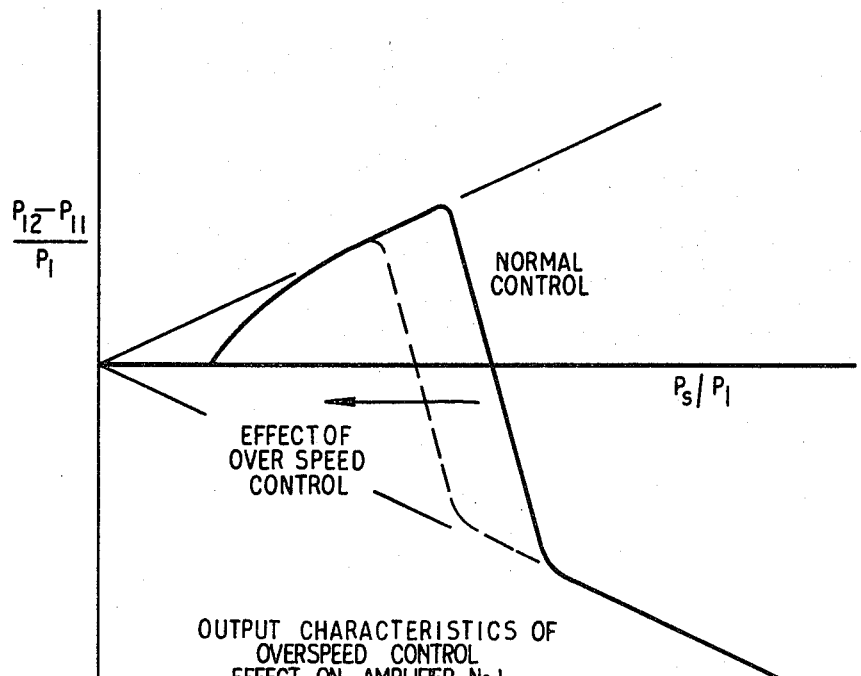

If the engine accelerates to its maximum permitted speed, the overspeed control operates as already described, closing down the restrictor 84 which carries the exhaust flow from orifice A4. This action initially generate a back pressure on orifice A4 causing it to become unchoked and then raises the pressure P above its normal value as shown on FIG. 18A. This has the effect of moving the balance point on the amplifier 110 to a lower, and lower value of Ps/P1 reducing the fuel flow demand until the acceleration is checked and a stabilised steady running condition is obtained.

Jet Pipe Temperature Control and T2 Compensator

The functioning of the range pressure ratio control 18 depends on the use of two orifice potentiometers. In particular, Ps/P1 is related to P2/P1 by the variable potentiometer area ratio A1/(A2+A3), and $P_R$/P1 is related to Ps/P1 by the fixed potentiometer area ratio A3/A4. The design relationships hold when the temperature of the air flowing through the orifices is constant, and this is the case under steady running conditions. However, during acceleration and deceleration, when the temperature T2 of the compressor delivery air is changing rapidly, the metal structure of the unit acts as a large thermal lag and modifies the temperature of the air as it passes through the two potentiometers. In the case of the fixed orifice pair, A3 and A4, for example the relationship between $P_R$/P1 is modified by the term $\sqrt{T_R/T_S}$. where $T_R$ is the absolute temperature of the air entering A4 and Ts is the absolute temperature of the air entering A3.

Figure 19:
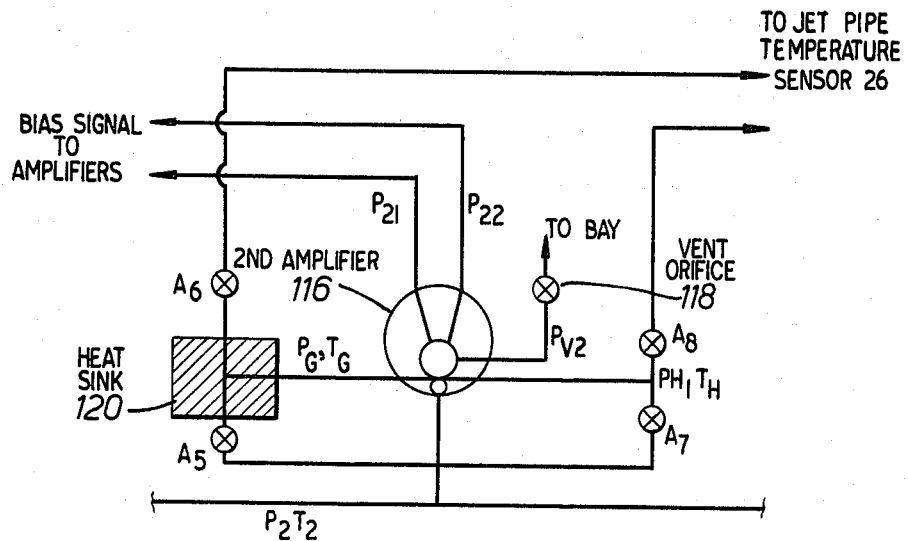

Because of the relative thermal capacities of the unit and the air flow, a significant error may be present for one to two minutes, before the temperatures equalise. In order to overcome this problem, a compensation circuit is introduced as shown in FIG. 19. A second amplifier 116 is powered from P2 air and has a vent pressure Pv2 stabilised in the normal manner by a vent orifice 118. A pair of orifices A5 and A6 form a fixed potentiometer to generate a signal pressure $P_G$ to one side of the amplifier 116.

A second pair of orifices A7 and A8 provide a similar signal pressure $P_H$ to the other side of the amplifier 116, and both potentiometers exhaust freely through the jet pipe temperature sensor 26. The orifice areas are adjusted so that the area ratio A5/A6 equals the ratio A7/A8 which means that under constant temperature conditions $P_G$ is equal to $P_H$ and the output of the amplifier 116 is balanced, i.e. P21=P22.

A heat sink of additional metal is incorporated between A5 and A6 so that when the supply temperature T2 changes as in acceleration or deceleration, the temperature $T_G$ of the air lags significantly behind the temperature $T_H$ of the opposing side. The effect is to modify $P_G$ by the factor $\sqrt{T_G/T_2}$ and this in turn produces a differential output from the amplifier 116. Thus during an acceleration, when T2 is increasing $T_G$ will lag and the term $\sqrt{T_G/T_2}$ will be less than unity. This means that $P_C$ will fall below $P_H$ and the amplifier differential output pressure P22−P21 will go negative. Conversely, during a deceleration, when T2 is reducing, $P_G$ will rise above $P_H$ and the output differential P22−P21 will go positive.

The amplifier output pressures P21 and P22 provide a bias signal which is added to the range pressure ratio control output in the next and third amplifier 122 and opposes the effect of a changing supply temperature T2. The size of the heat sink 120 determines the compensation time constant, and this will normally be chosen to match the time constant of the range pressure ratio control.

The compensator circuit offers a suitable point at which the jet pipe temperature control may be introduced. The exhaust flows from the two potentiometers are carried to the jet pipe temperature sensor 26 where they both exhaust freely to the bay. However, if the jet pipe temperature reaches the maximum permitted level, the sensor 26 begins to restrict the exhaust from the A7/A8 potentiometer. The initial effect is to unchoke the orifice A8, and then this is followed by a raising of the pressure $P_H$. When this occurs, the amplifier output becomes unbalanced and the pressure differential P22−P21 goes negative. This signal biases the following stage of amplification where it is added to the range pressure ratio control signal, and the net result is to demand a reduced fuel flow. The bias increases rapidly with increase in temperature, reducing the fuel flow until a steady engine condition is achieved.

Jet Pipe Temperature Sensor 26

Figure 20:
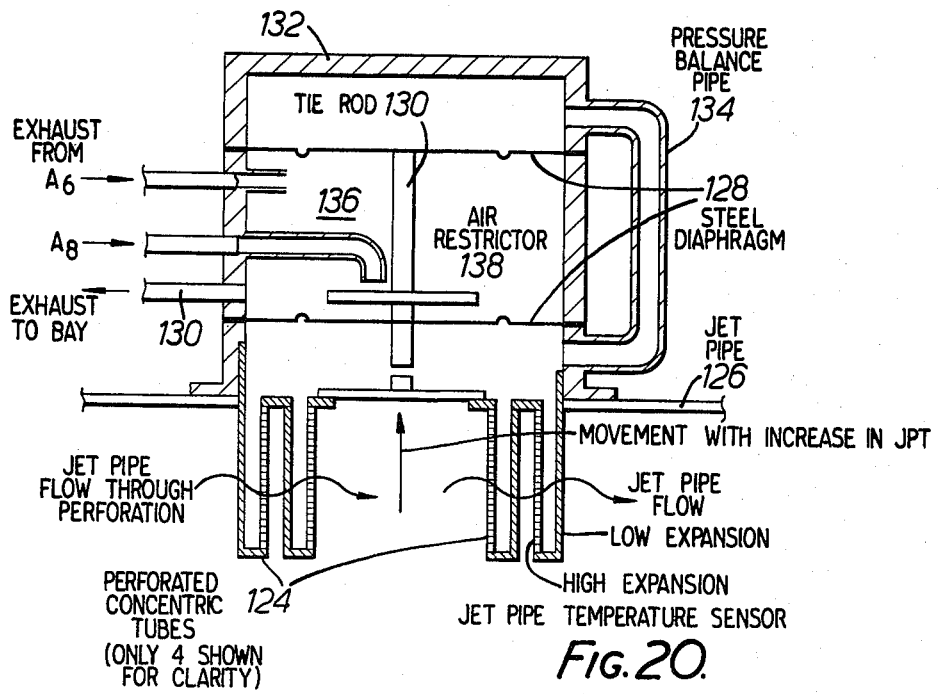

The jet pipe temperature sensor 26 is shown in FIG. 20. A series of concentric tubes 124 made of two materials having different thermal expansion coefficients extends into the jet pipe 126. The tubes 124 are connected at alternate ends so that differential thermal expansion creates an additive movement in the direction shown with increasing jet pipe temperature. The tubes 124 are perforated to allow the jet pipe gases to flow through them to increase the heat transfer and give good thermal response. Two steel diaphragms 128 connected by a tie rod 130 are mounted in a housing 132 above the concentric tubes 124, and a pressure balance pipe 134 is incorporated to equalise the pressure loading on the diaphragm assembly. The chamber 136 between the diaphragms 128 is vented to the jet pipe bay along conduit 130. The exhaust flows from the jet pipe temperature control and T2 compensator potentiometers are also piped into the chamber 136. The flow from A6 passes freely in, but the flow from A8 has to pass through a simple variable air restrictor 138 operated by the tie rod 130.

When the jet pipe temperature is below the maximum, the concentric tube assembly remains clear of the lower diaphragm 128 and the air restrictor 138 is fully open. The sensor 26 thus has no effect on the exhaust flows from A6 to A8.

As the jet pipe temperature increases towards the maximum, the concentric tube assembly expands and moves towards the lower diaphragm 128, eventually contacting it and moving the tie rod 130 upwards. Further increase in jet pipe temperature causes the tie rod 130 to be moved further upwards, progressively closing the air restrictor 138, and eventually shutting it. This action provides the signal described in the above passage entitled Jet Pipe Temperature and T2 Compensator.

Amplifiers

Figure 21:
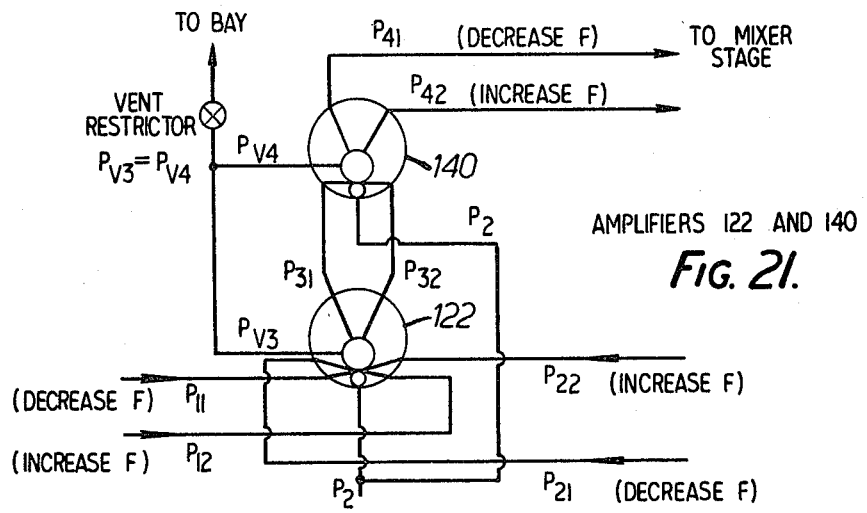

The outputs from the range pressure ratio control 18, and the jet pipe temperature control and T2 compensator are added together in the third amplifier 122. Further gain is then provided in a fourth amplifier 140. This is illustrated in FIG. 21. The effect of P12 and P22 is to demand an increase in fuel flow, whilst the effect of P11 and P21 is to demand a decrease in fuel flow. The output differential pressure P42−P41 is therefore defined as:

$$P42-P41=G3\ G4(P12-P11+P22-P21)$$

where G3 and G4 are the pressure gains of the amplifiers 122 and 140 respectively.

Both amplifiers 122 and 140 are supplied from compressor delivery pressure P2 and have a common stabilised vent pressure.

Acceleration Control

The purpose of the acceleration control is to generate an output signal as a shaped function of compressor pressure ratio P2/P1 in order to limit the fuel flow during rapid acceleration so that compressor surge is avoided.

Figure 22:
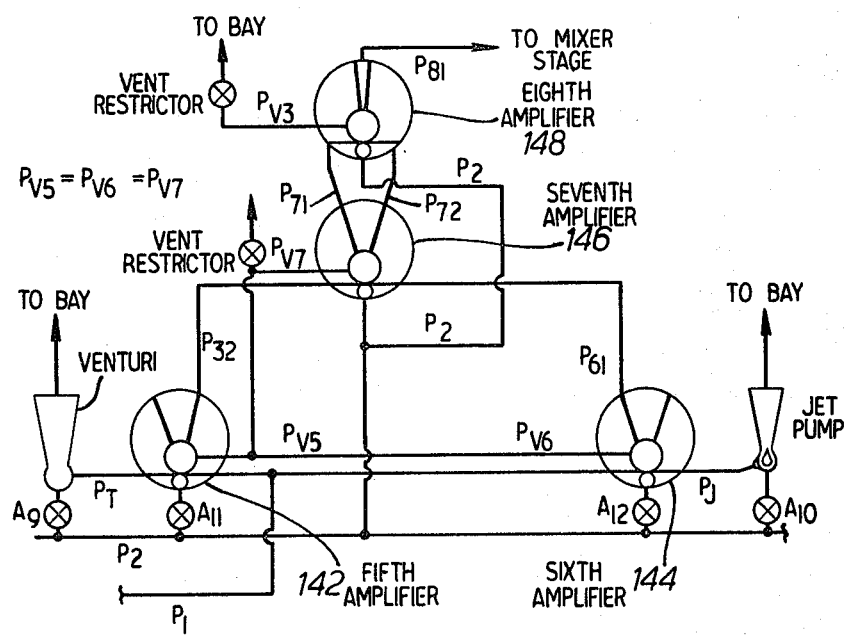

The acceleration control is shown in FIG. 22 and contains four amplifiers 142, 144, 146, 148, a jet pump 150 and a venturi 152. The venturi 152 is supplied from compressor delivery pressure P2 via the orifice A9, and exhausts to the engine bay. The pressure $P_T$ at the venturi throat is connected to one control port of the fifth amplifier 142, the other control port being connected to intake pressure P1. The variation of $P_T$/P1 with P2/P1 shown in FIG. 23. With increasing pressure ratio P2/P1, the throat pressure ratio $P_T$/P1 initially falls until choking flow occurs, and then it rises linearly with P2/P1, passing through unity ($P_T$ − P1) at the point T on FIG. 23, where P2/P1 has the fixed value $(P2/P1)_T$. The magnitude of $(P2/P1)_T$ is set by the orifice A9. Reducing the area of A9 increases $(P2/P1)_T$, and the typical range of adjustment is approximately $(P2/P1)_T=2$ through 5.

Figure 23:
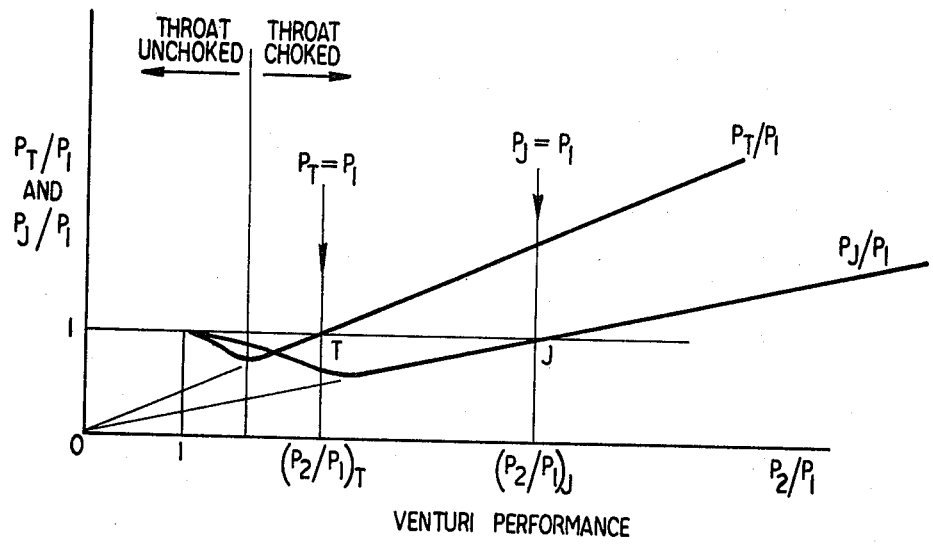
Figure 24:
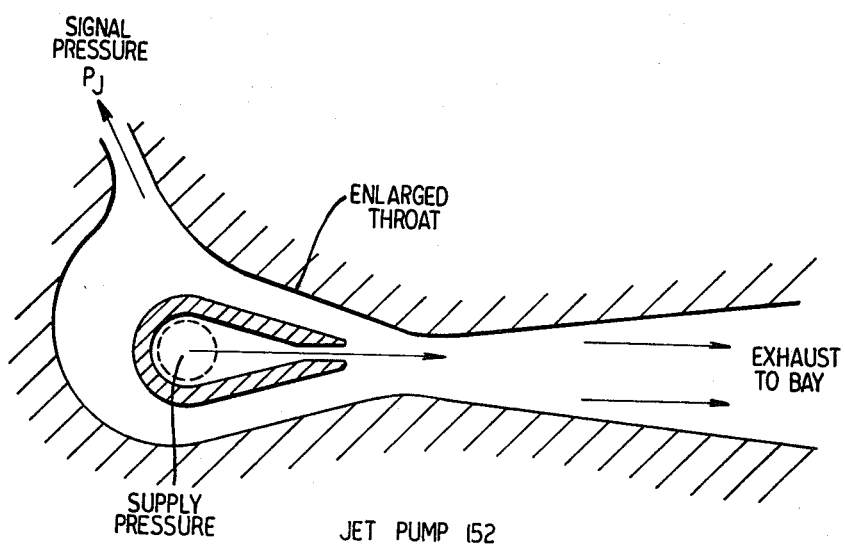

The jet pump 150 is similar in design to the venturi 152 except that it has an enlarged throat as shown on FIG. 24. The performance is almost identical except that it functions over a higher pressure ratio range as shown in FIG. 23. The ratio $P_J$/P1 passes through unity ($P_J$=P1) at the point J where P2/P1 has the fixed value $(P2/P1)_J$ and the magnitude of $(P2/P1)_J$ is set by the orifice A10. Pressure $P_J$ is connected to one control port of the sixth amplifier 144, the other control being connected to intake pressure P1.

Figure 25A:
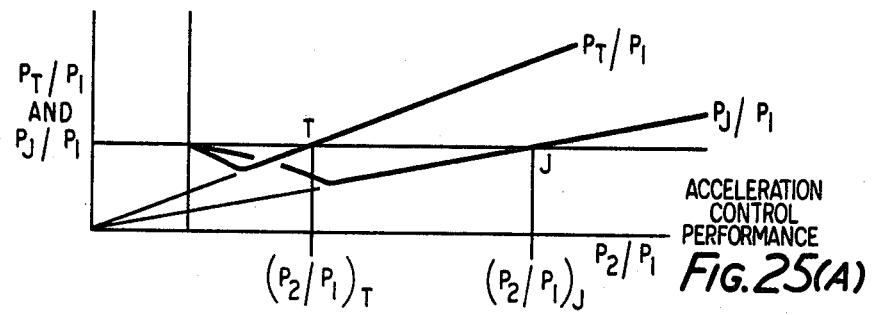
Figure 25B:
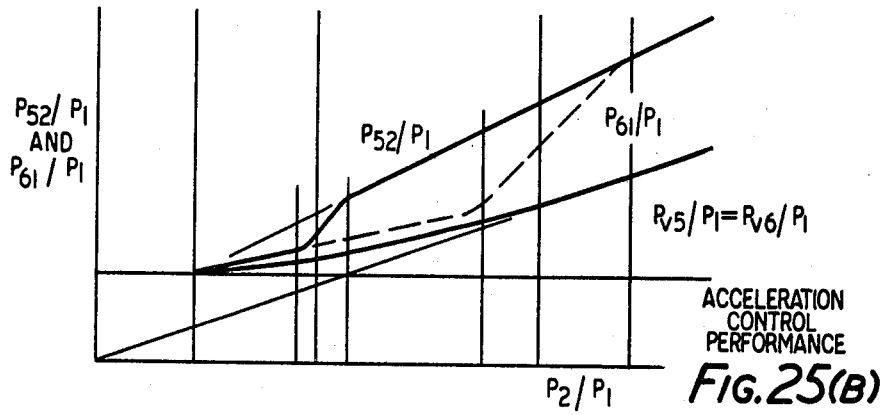

The amplifiers 142 and 144 are identical in geometry and share a common vent pressure. They draw their power supplies from P2 via the orifices A11 and A12 respectively. These are adjusted so that the power supply to each is identical, and therefore these amplifiers 142 and 144 give identical maximum and minimum output levels. These outputs are shown in non-dimensional form P52/P1 and P61/P1 in FIG. 25B.

Figure 25C:
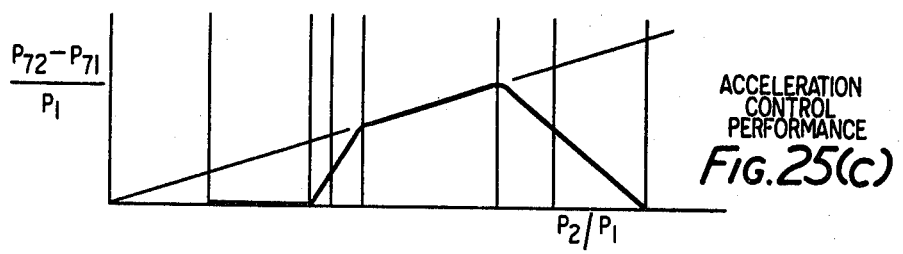

The outputs P52 and P61 are connected to the control ports of the seventh amplifier 146. This has a common vent level with amplifiers 142 and 144 and takes its power supply directly from P2. The output pressure differential P72−P71 from the amplifier 146 is directly proportional to the difference between the two control pressures P52−P61, and this is shown in non-dimensional form in FIG. 25C.

Figure 25D:
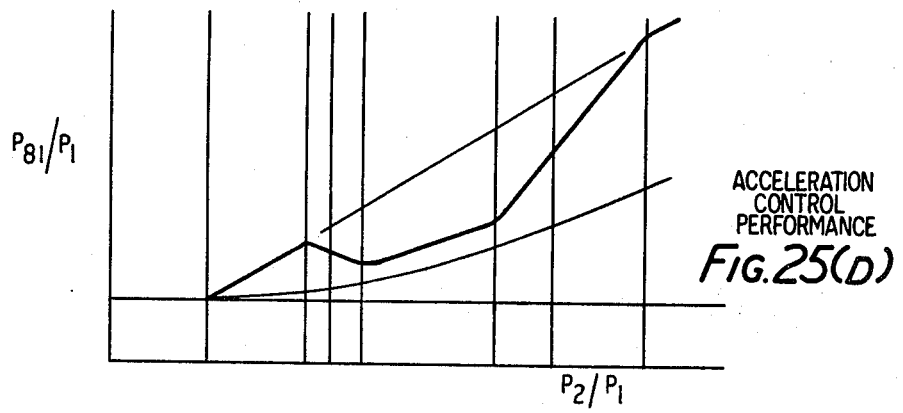
Figure 26A:
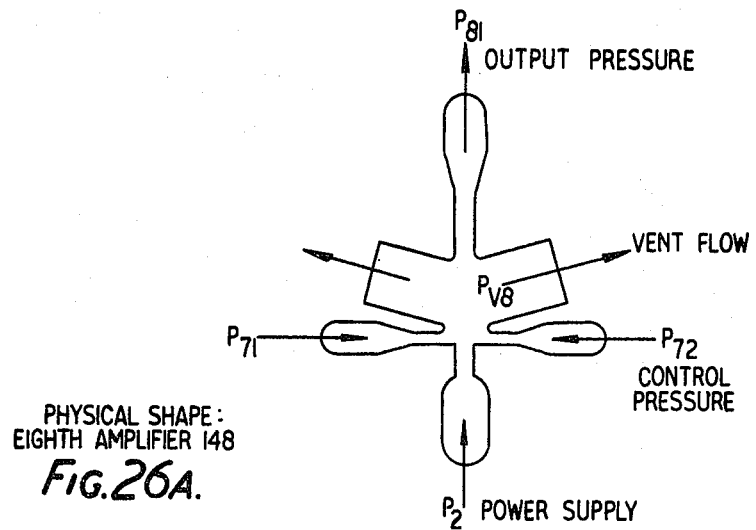
Figure 26B:
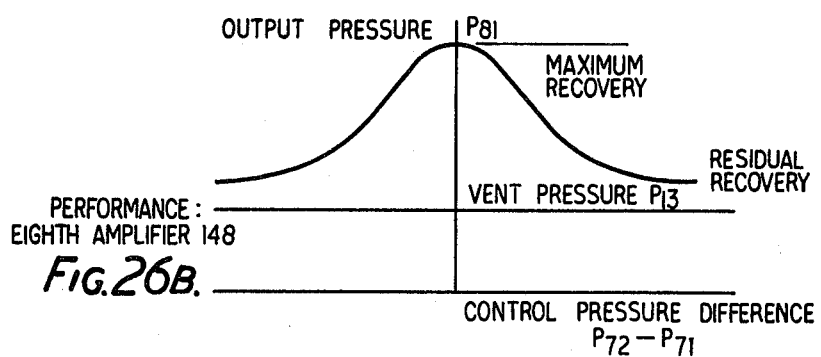

The outputs from the amplifier 146 go to opposing control ports in the eighth amplifier 148. This amplifier 148 is a momentum interaction device having a single central receiver, as shown in FIG. 26A and having a performance characteristic as shown in FIG. 26B. The output from this amplifier 148 is therefore effectively an inversion of the control input and is shown in non-dimensional form, P81/P1 on FIG. 25D.

The output signal P81/P1 is the shaped function of P2/P1 which is ultimately used to control the engine fuel flow during rapid accelerations. It is essential therefore that minor adjustments can be made to the shape.

Figure 27:
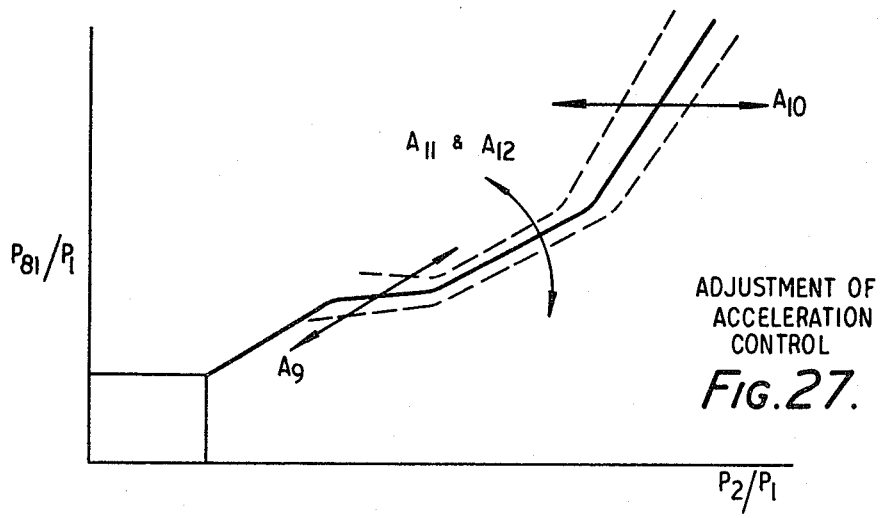

As already stated, adjustment of orifices A9 and A10 will alter the values of $(P2/P1)_T$ and $(P2/P1)_J$ and the effect of this is shown in FIG. 27. Adjustment of orifice A11 will alter the power supply to the amplifier 142, thus changing its maximum output which alters the level of the mid part of the characteristic. Parallel adjustment of orifice A12 would be required to maintain the proper balance between the amplifiers 142 and 144. The effect of this adjustment is also shown in FIG. 27.

Mixer Stage 24

Figure 28A:
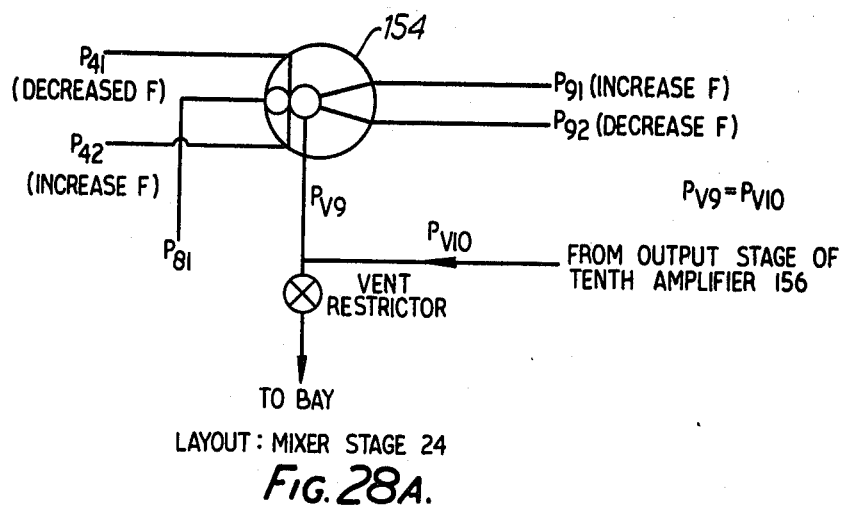

This unit consists of a ninth amplifier 154 and has a power supply of P81 from the previous stage, and a common vent pressure with the output stage of a tenth amplifier 156 as shown in FIG. 28A. The maximum available output pressure P91 will therefore follow a similar pattern in terms of P91/P1 against P2/P1 as does P81/P1. The minimum possible value for P91 is controlled by the vent pressure Pv9 which is set by the output stage vent Pv10.

Figure 28B:
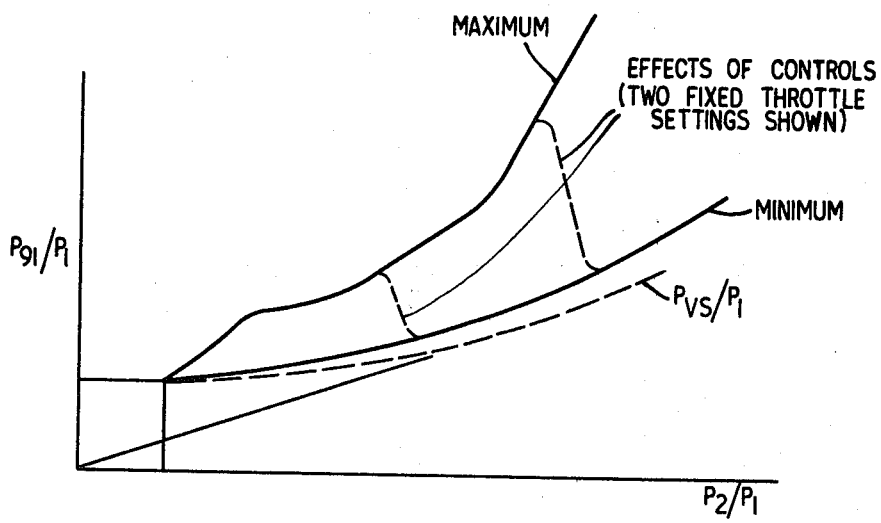

Control of P91 between its maximum and minimum values is effected by the pressures $P_{41}$ and $P_{42}$ from the amplifier 140 acting on opposite control ports of the mixer stage 112. When P42 is greater than P41, P91 is increased towards the maximum. When P42 is less than P41, P91 is reduced towards the minimum. These pressures are originally controlled by the pilot's throttle acting through the range pressure ratio control, with secondary inputs from the overspeed control 25, and jet pipe temperature control and $T_2$ compensator. The pilot's throttle, with the other controls where appropriate, is therefore able to control P91 between its maximum and minimum limits. This is illustrated in FIG. 28B.

The other output pressure P92 will swing between the same maximum and minimum limits but in the opposite direction. This is not shown on FIG. 28B for clarity.

Output Stage 28

Figure 29A:
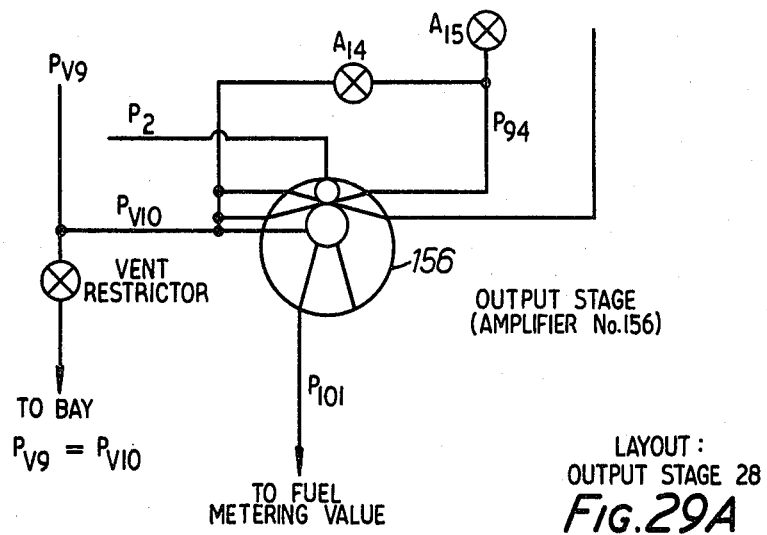

This unit consists consists of the tenth amplifier 156 and it provides the final output $P_{101}$ from the fluidics to the pressure sensitive capsule 54 in the fuel metering valve 10. It consists of a proportional amplifier having two pairs of control ports, and is powered directly from compressor delivery pressure P2 as shown on FIG. 29A. The mixer stage output P91 is connected to one control port of the output stage 28. The other output P92 is connected via the potentiometer orifices A13 and A14 to the common vent pressure Pv10 (=Pv9). The intermediate pressure P94 is connected to the second control port of the output stage 28 in parallel with P91. The two opposing control ports on the output stage are connected directly to the common vent Pv10.

When a rapid acceleration is demanded, the mixer stage output P91 is driven to its maximum value as shown on FIG. 28B. This acts on the output stage and the output pressure $P_{101}$ follows the shape of P91 as the engine accelerates. The other output P92 from the mixer stage is at its minimum value just above the common vent pressure Pv9 (=Pv10) so the reduced intermediate pressure P94 is approximately at vent level and therefore contributes a negligible amount to the output pressure $P_{101}$.

When rapid deceleration is demanded, the pressures P91 and P92 are reversed. the pressure P91 is driven to its minimum value, whilst P92 rises to its maximum value.

Figure 29B:
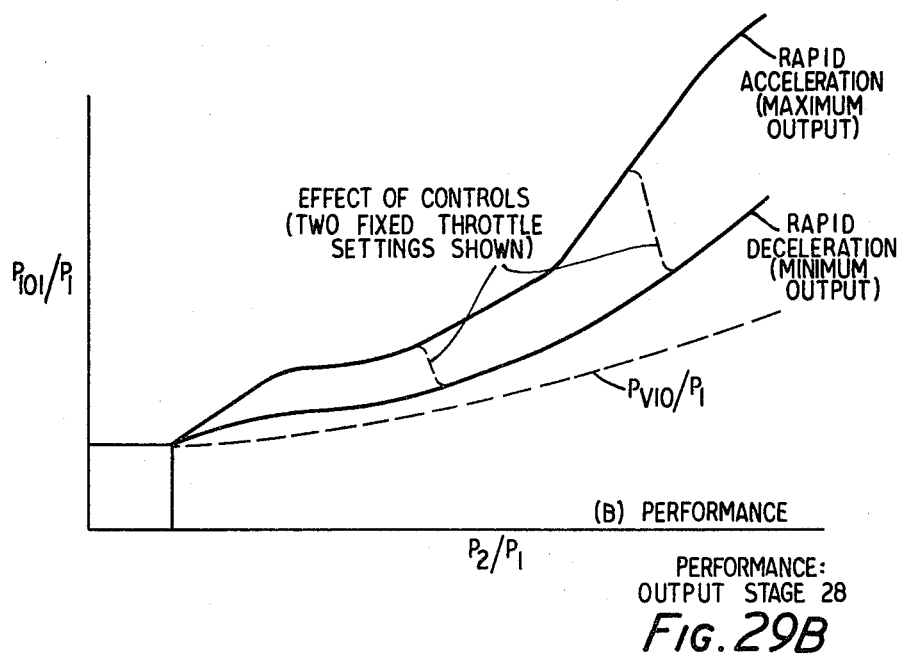

The effect of the potentiometer A13 and A14, is to reduce P92 to the lower level, P94, between P92 and Pv10, the degree of reduction being dependent on the ratio A13/A14. In practice, this will be set so that P94 falls closer to the vent level Pv10, than to P92. The output pressure $P_{101}$ is therefore controlled by P94 with a small contribution from P91. The combined effect is to control $P_{101}$ to a reduced "image" of the rapid acceleration case. The variation of the non-dimensional term $P_{101}/P1$ with compressor pressure ratio P2/P1 is shown on FIG. 29B.

Modulation of the mixer stage output between its two limits simply produces a smooth transition of $P_{101}$ from the rapid acceleration line to the rapid deceleration line. The two fixed throttle lines from FIG. 28B are shown on FIG. 29B to illustrate this.

From equation 13, it has already been shown that $$\frac{F}{P_1 N} = \frac{P_{101}}{P1} \sqrt[4]{\rho_F} \; K_F \sqrt{2Kc}$$

Within the limits of the variation of fuel density $\rho F$ with temperature, this amounts to $$\frac{F}{P_1 N} = \text{Constant} \times \frac{P_{101}}{P1}$$

Figure 30:
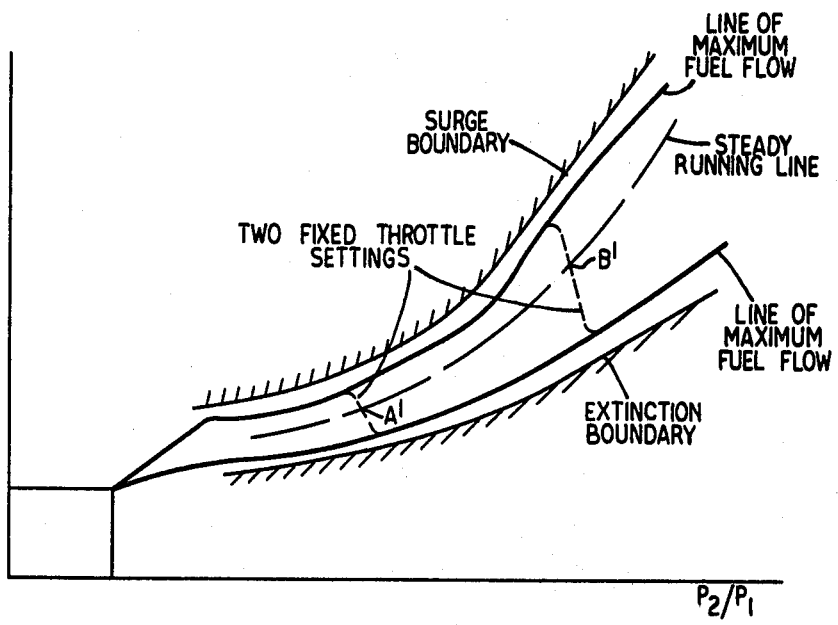

The variation of $(F/P_1 N)$ with (P2/P1) is shown in FIG. 30. The line of maximum fuel flow corresponds to the rapid acceleration line in FIG. 29B and the line of minimum fuel flow across corresponds to the rapid deceleration line in FIG. 29B. Two lines of fixed throttle settings are also shown on FIG. 30 and these correspond to the two shown in FIG. 29B.

In addition, the surge and extinction boundaries and engine steady running line are shown in FIG. 30. The points A' and B' where the steady running line cuts through the fixed throttle settings, represent the stabilised control points for those throttle settings.

We claim:

1. An emergency fuel control system for an aircraft engine, which emergency fuel control system includes means for supplying emergency fuel to the engine in an amount proportional to engine speed and compressure pressure ratio, said control system comprising: means for converting a pilot's throttle lever position into a demand compressor pressure ratio signal; means for sensing actual compressor inlet pressure and actual compressor outlet pressure; first fluidic means responsive to the pilot's throttle lever position and to said actual compressor inlet and outlet pressures, said first fluidic means for comparing actual compressor pressure ratio with demand compressor pressure ratio and providing an error signal as a fluidic control pressure; means providing fluidic sensor inputs corresponding to engine speed and jet pipe temperature for limiting engine performance; second fluidic means for computing actual compressor pressure ratio and for generating an output signal pressure as a particular function of engine compressor ratio; fluidic mixer means responsive to output signals from said first and second fluidic means to limit the output signal from said first fluidic means; and a fluidic output device which receives signals from the fluidic mixer means and which generates a signal which has substantially the same shape as the acceleration control signal but which is at a lower level and which is used to define the minimum amount of fuel that is safely required by the engine in order to maintain combustion.

2. An emergency fuel control system according to claim 1 in which the means for providing fluidic sensor inputs which limit the engine performance comprise a jet pipe temperature sensing device and a fluidic overspeed controller device.

3. An emergency fuel control system according to claim 1 and including fluidic compensator means for compensating for errors produced by changes of temperature, the fluidic compensator including a non-fluidic heat sink.

4. An emergency fuel control system according to claim 1, 2 or 3 in which the means for supplying the emergency fuel includes a spill control valve and a fuel change-over valve.

5. An emergency fuel control system according to claim 4 in which the means for supplying emergency fuel includes fuel density compensating means for compensating for varying changes in the density of the fuel.

6. An emergency fuel control system according to claim 5 in which the means for supplying the emergency fuel includes a positive displacement pump.

7. An emergency fuel control system according to claim 5 in which the means for supplying the emergency fuel includes a centrifugal pump.

8. An emergency fuel control system according to claim 1, 2 or 3 in which the means for supplying the emergency fuel comprises a lever which is acted upon by an evacuated bellows arrangement and by a spring, the lever having valve means for controlling the amount of fuel led away from the engine.

9. An emergency fuel control system according to claim 8 in which the valve means comprises a half ball valve on the lever, the lever pivoting at its end remote from the bellows device.

* * * * *